F. H. CARSSOW.
MEASURING AND RECORDING INSTRUMENT.
APPLICATION FILED AUG. 9, 1905.

992,110.

Patented May 9, 1911.
10 SHEETS—SHEET 4.

Witnesses:
Titus H. Gross.
Augustus B. Cppes

Inventor:
Felix H. Carssow,
by his Attorneys,
Howson & Howson

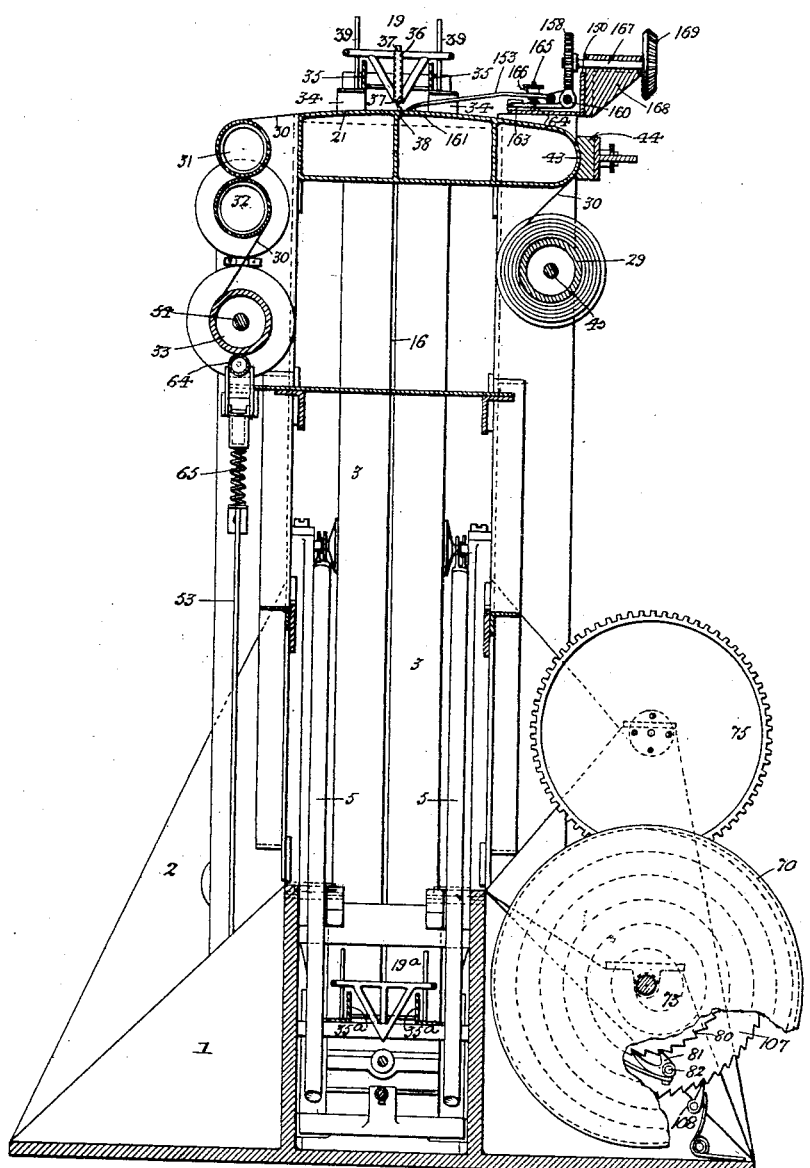

F. H. CARSSOW.
MEASURING AND RECORDING INSTRUMENT.
APPLICATION FILED AUG. 9, 1905.
992,110.
Patented May 9, 1911.
10 SHEETS—SHEET 6.
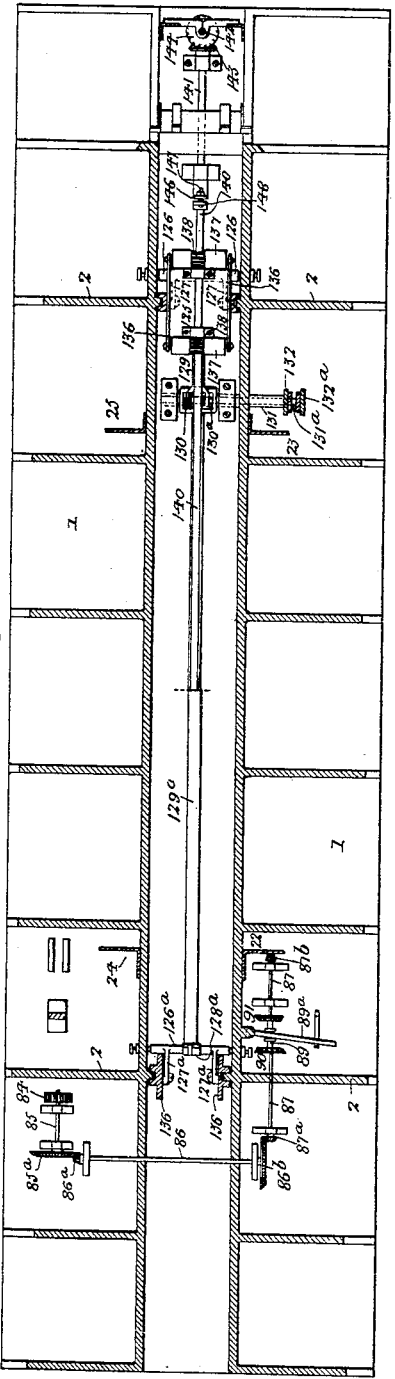
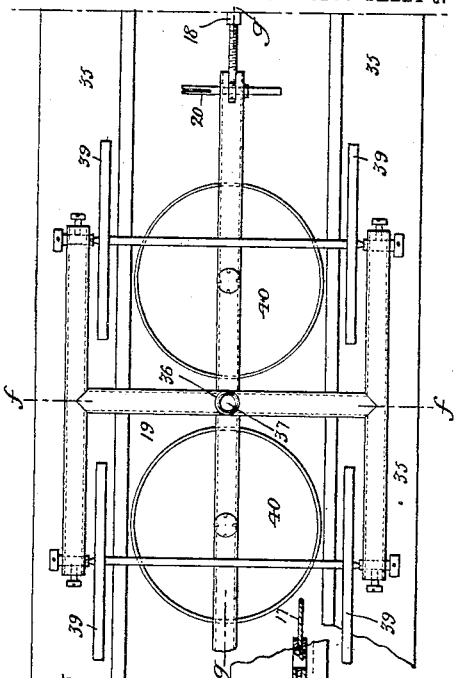
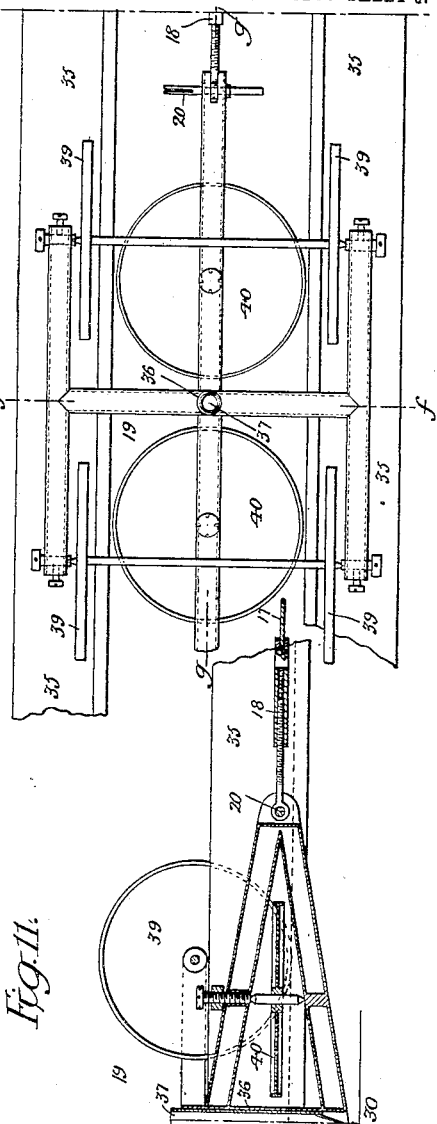
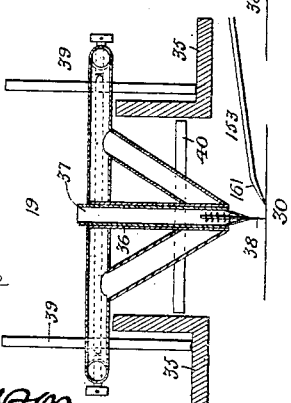
Witnesses:
Titus H. Irons.
Augustus B. Coppes
Inventor:
Felix H. Carssow,
by his Attorneys,
Howson & Howson F. H. CARSSOW.
MEASURING AND RECORDING INSTRUMENT.
APPLICATION FILED AUG. 9, 1905.
992,110.
Patented May 9, 1911.
10 SHEETS—SHEET 7.
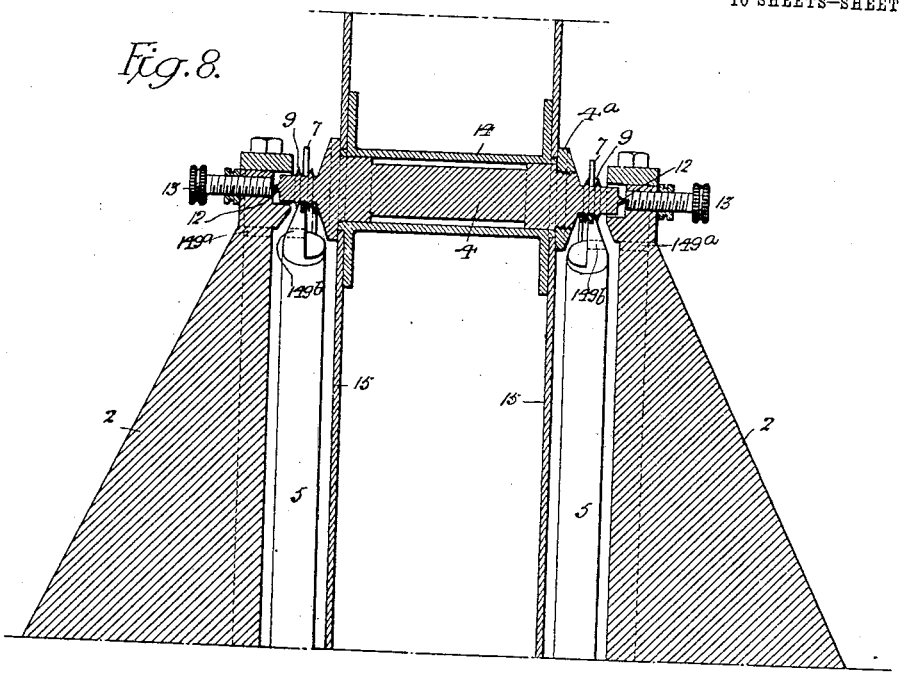
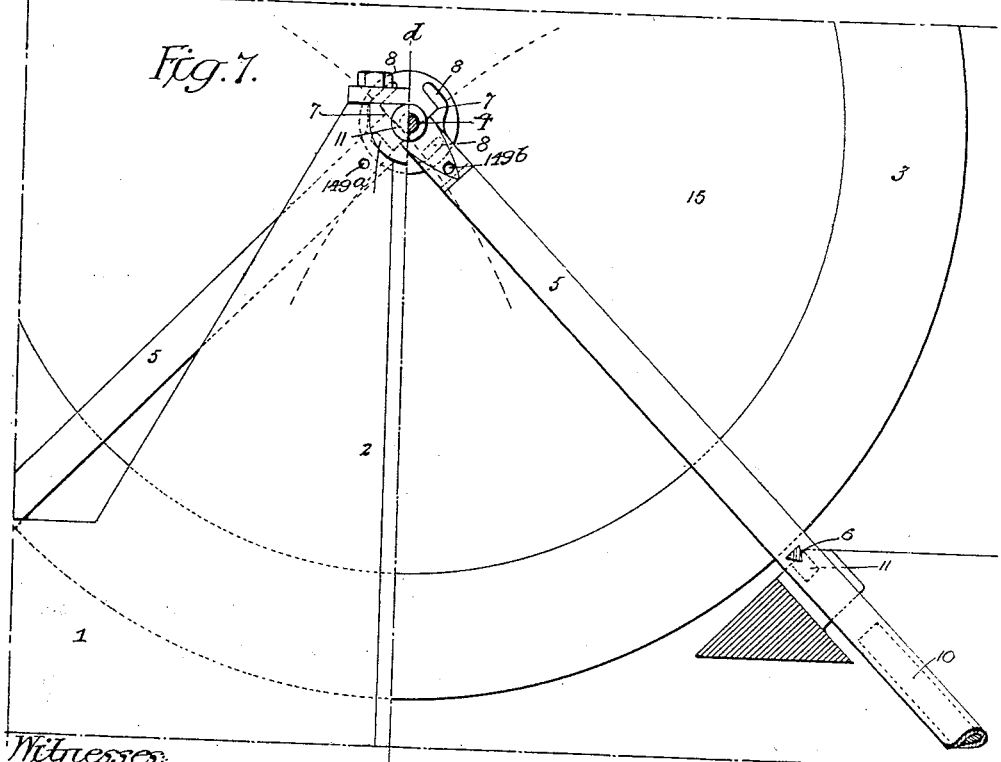

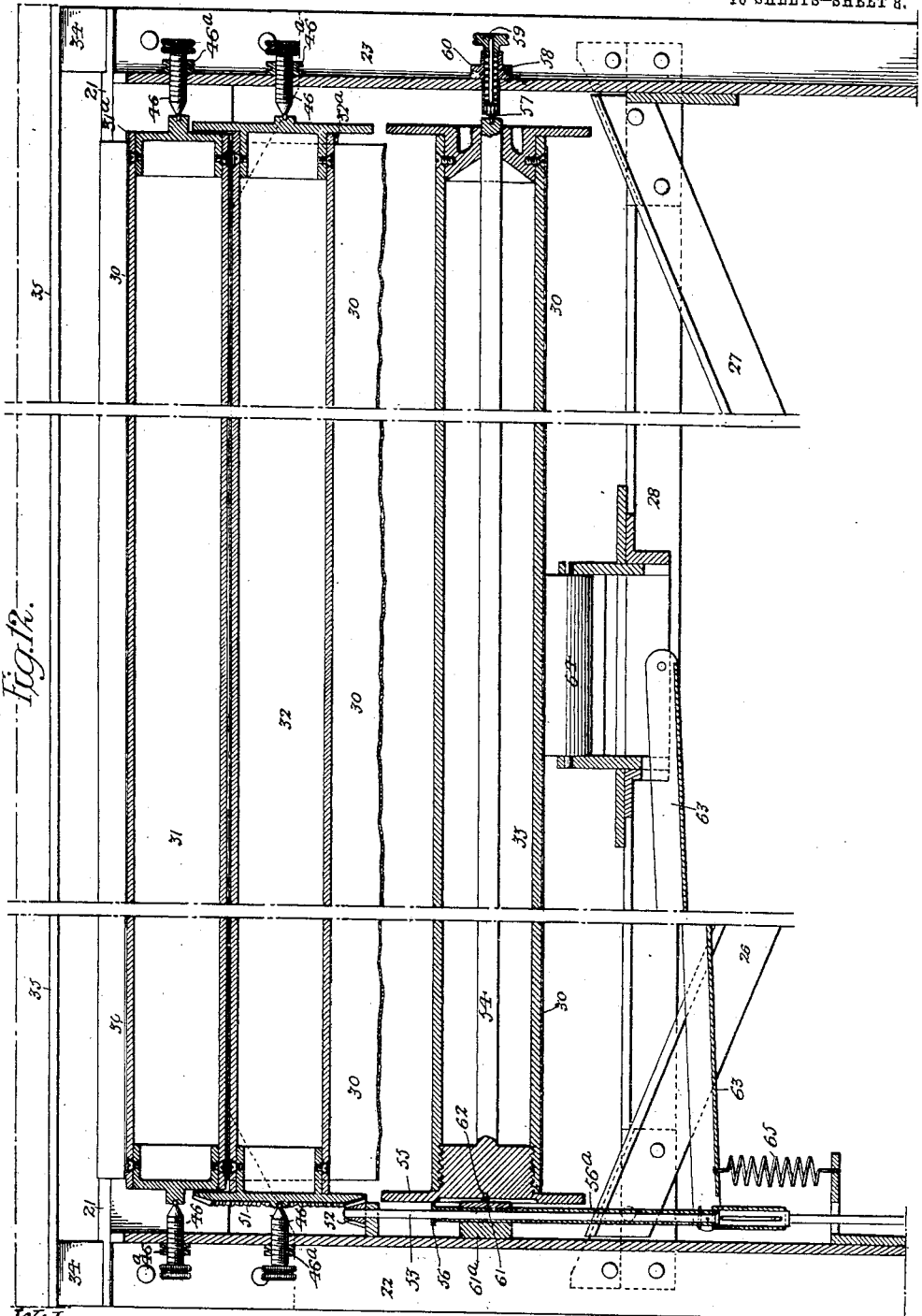

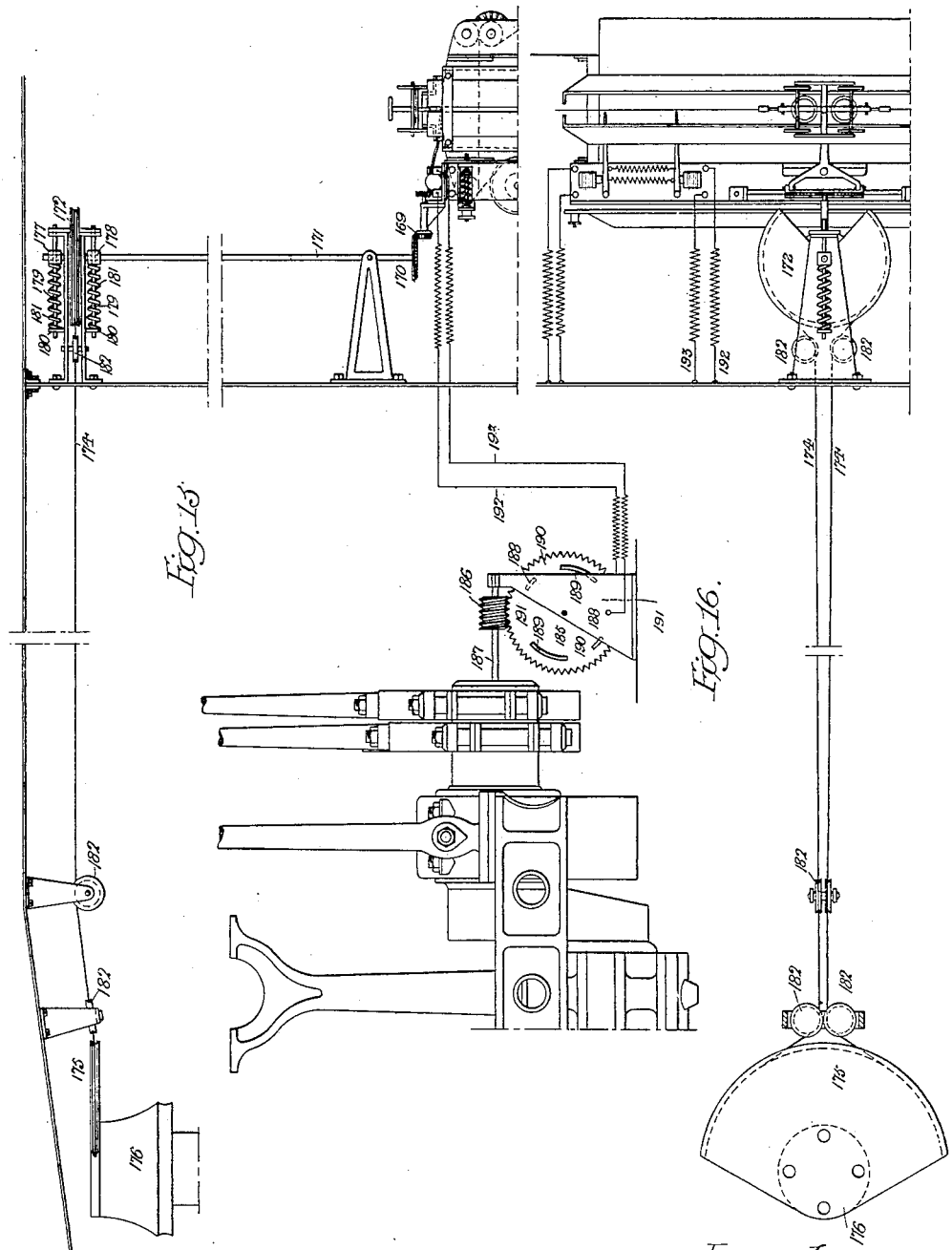

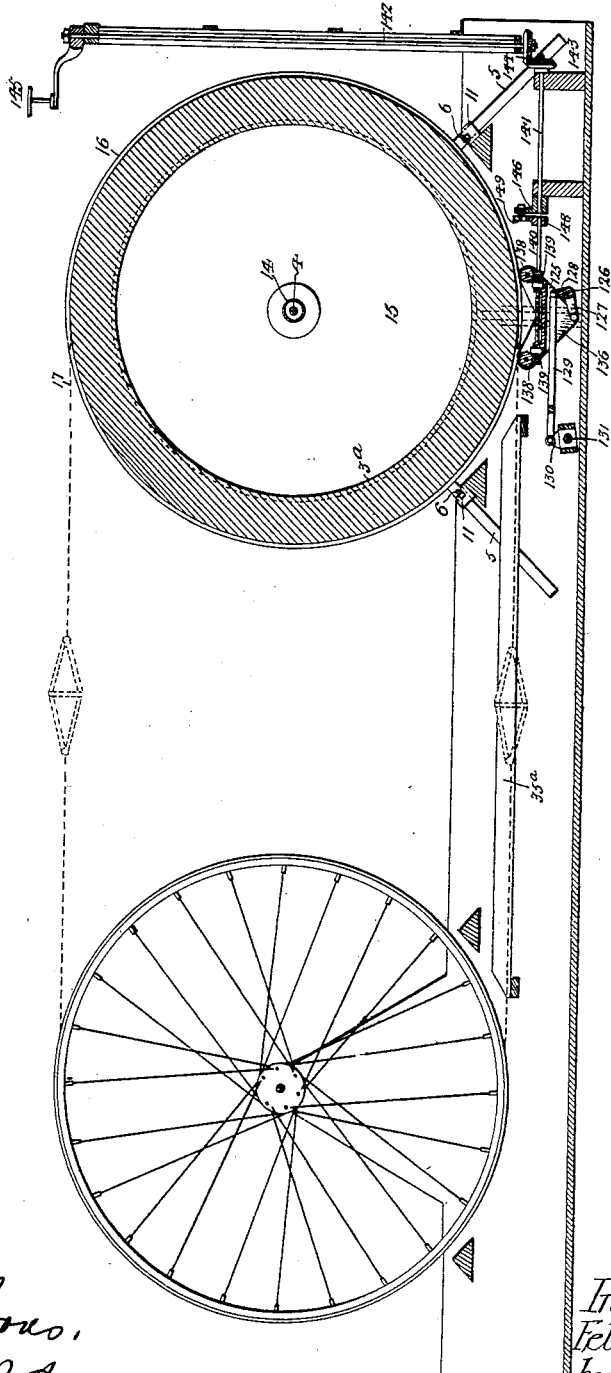

UNITED STATES PATENT OFFICE.

FELIX H. CARSSOW, OF CAMDEN, NEW JERSEY.

MEASURING AND RECORDING INSTRUMENT.

992,110.  Specification of Letters Patent.  Patented May 9, 1911.

Application filed August 9, 1905. Serial No. 273,431.

*To all whom it may concern:*

Be it known that I, FELIX H. CARSSOW, a citizen of the United States, and a resident of Camden, New Jersey, have invented an Improved Measuring and Recording Instrument, of which the following is a specification.

My invention relates to recording mechanism and consists of an instrument designed for indicating, measuring and recording, continuously or otherwise, the inclinations of ships or other floating bodies from the vertical, whether such inclinations are incident to their rolling, pitching and other motions singly or combined; which instrument may also be used for simultaneously indicating, measuring and recording other data desired therewith.

The objects of my invention are: first, to accurately measure and record, continuously or otherwise, the inclination of a ship or other floating body from the vertical, incident to its rolling, pitching and other motions; the record made being to such scale as to show clearly the character of the change of inclination, *i. e.*, its angular velocity at any time; second, to simultaneously record the inclination of a ship or boat from the vertical, the time and outside interruptions chronographically, and of the modifying causes, the position of its rudder and the velocity and direction of rotation of its propeller or propellers; third, to provide an instrument of the class described so constructed that other recording devices may be added to or substituted for those shown and described, whereby the effect of the rolling and pitching motions on pendulums of various lengths, the velocity of the wind, or any other desired information, may be indicated, measured and recorded.

Figure 1:
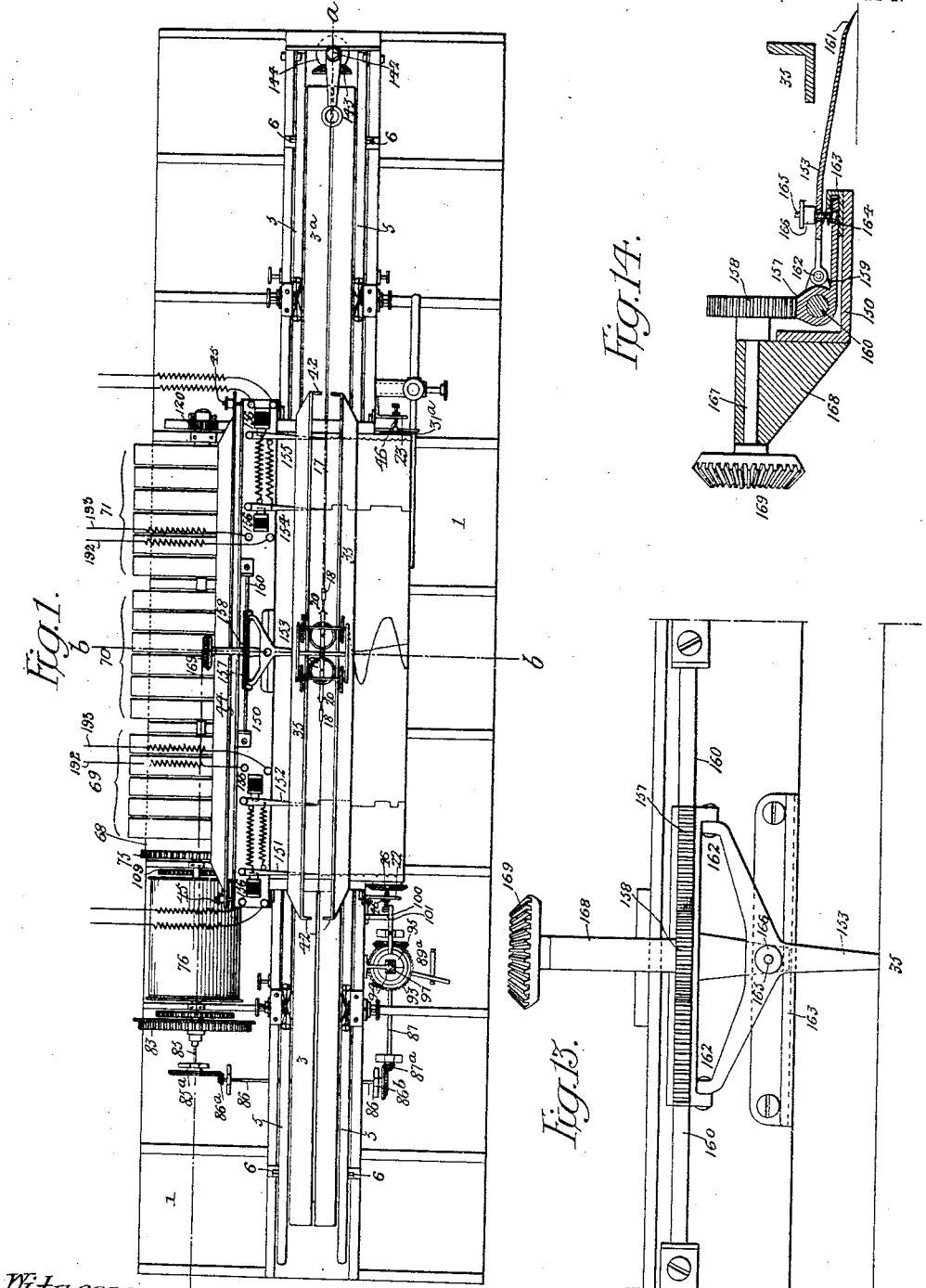
Figure 2:
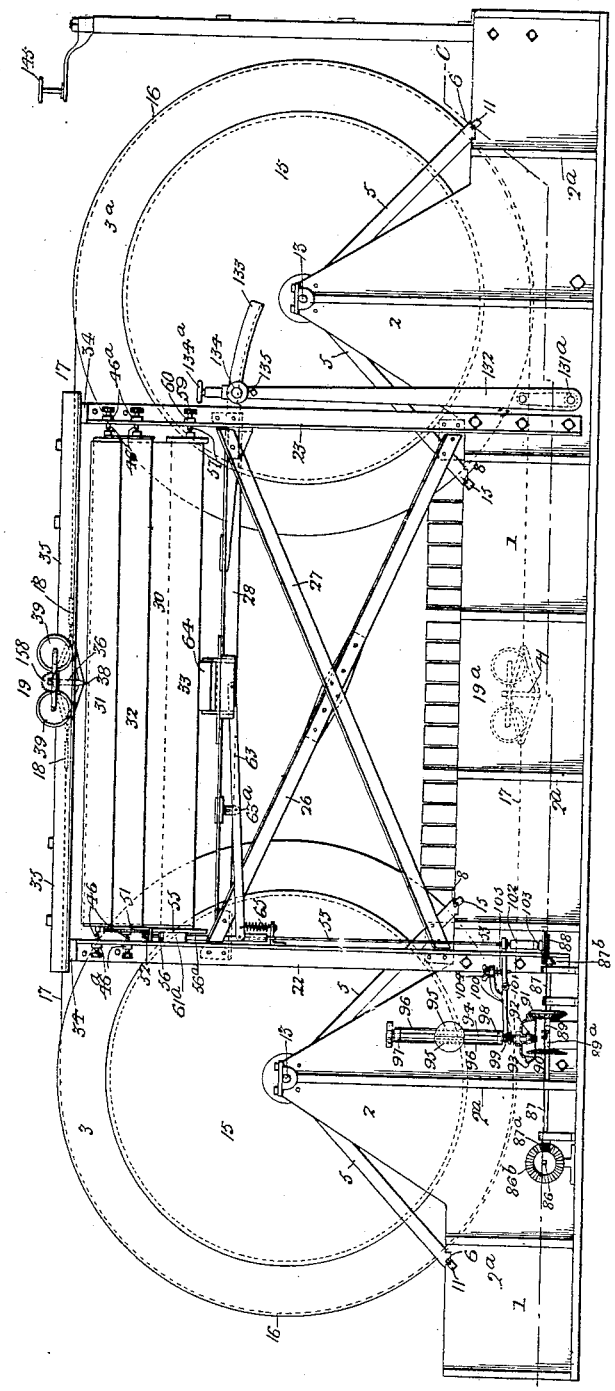
Figure 3:
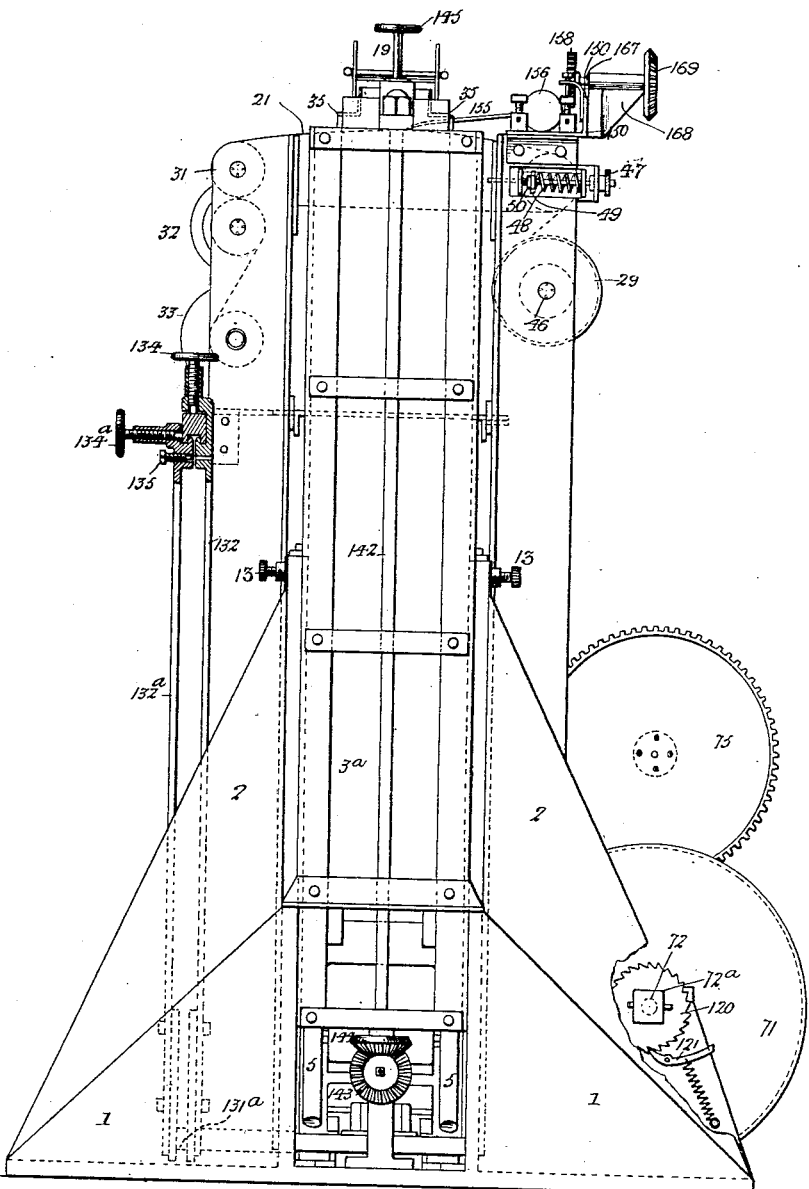
Figure 4:
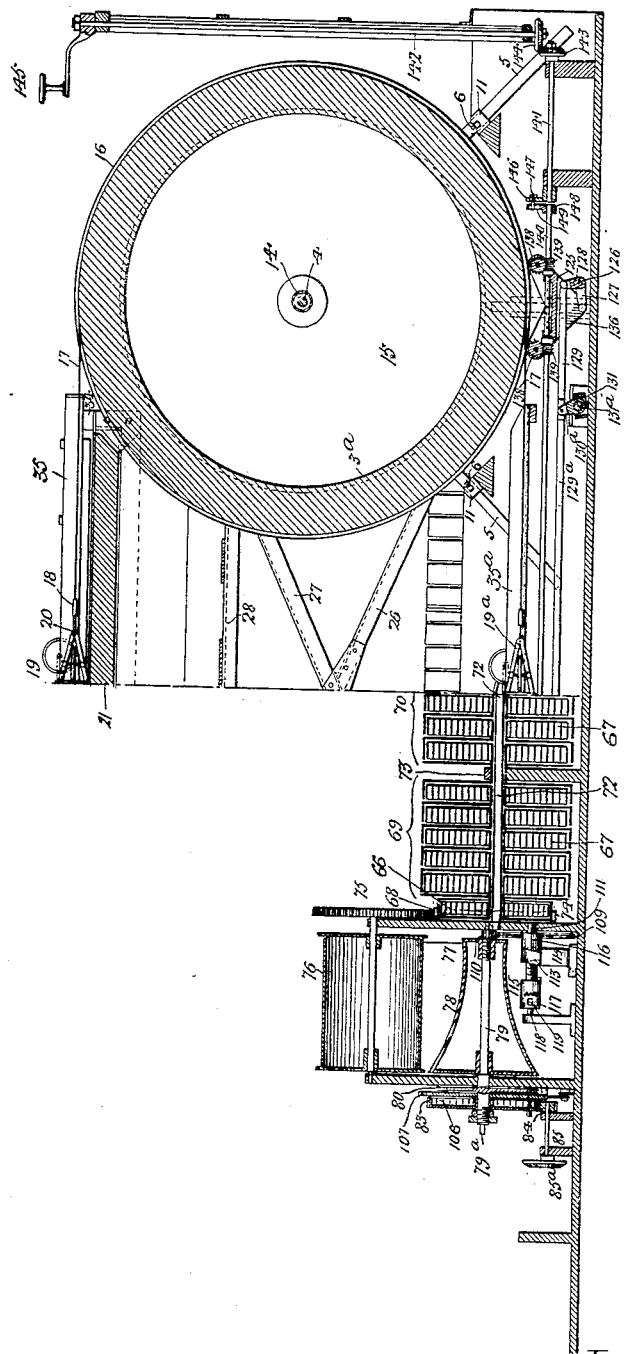

My invention is fully illustrated in the accompanying drawings, in which:

Figure 1, is a plan view of the measuring and recording instrument forming the subject of my invention; Fig. 2, is a front elevation of the same; Fig. 3, is an end elevation on an enlarged scale, looking in the direction of the arrow *x*, Fig. 2; Fig. 4, is a longitudinal sectional view taken on the line *a—a*, Fig. 1; Fig. 5, is a cross sectional view on an enlarged scale, taken on the line *b—b*, Fig. 1; Fig. 6, is a sectional plan view, taken on the line *c—c*, Fig. 2; Fig. 7, is a side elevation on an enlarged scale, partly in section, of a mounting for a part of the mechanism forming the subject of my invention; Fig. 8, is a sectional view of the mounting, taken on the line *d—d*, Fig. 7; Fig. 9, is a plan view on an enlarged scale, of a pen-holding carriage employed in connection with my measuring and recording instrument; Fig. 10, is a cross sectional view of the pen-holding carriage, taken on the line *e—e*, Fig. 9; Fig. 11, is a longitudinal sectional view of one-half of the pen-holding carriage, taken on the line *f—f*, Fig. 9; Fig. 12, is an enlarged sectional view, partly broken away, of the rollers employed for taking care of the record sheet; Figs. 13 and 14, are views of a special detail of my invention: Fig. 15. is an end elevation of the instrument set up to observe the rolling motions of a twin screw ship, showing the connection with a special form of circuit closer at the forward end of one of the propeller shafts, the mechanical connection to the rudder post, and the conducting wires to the pens; Fig. 16, is a plan view of part of Fig. 15, and Fig. 17, is a side elevation of a modified form of instrument of the general character forming the subject of my invention.

In the following description of the instrument and its mode or method of operation, the base is assumed to lie in a horizontal plane when the ship or other floating body is on an even keel and without list.

The instrument forming the subject of my invention consists of the trough shaped base 1, suitably braced and having the necessary thrust standards 2 and strengthening webs 2ª. Between the thrust standards are mounted two wheels 3 and 3ª, which I have termed "clinometric wheels," so constructed that the mass of each is distributed to give the maximum moment of inertia about its axis of rotation. The axles 4 of the said wheels are supported near each end, by rocker bearings formed by the members 5, so as to be parallel, or approximately parallel to each other. The members 5 are supported by knife-edged projections 6, and the surface 7 of each rocker bearing in engagement with the axle, is generated by a curve revolved about the bearing line of said knife edged support, as an axis; such bearing surface being provided at each end with a projection 8, all of which parts are clearly shown in Figs. 7 and 8. The tops of the members 5 are prevented from touching each other and the tops of the thrust standards 2, by thin disks or collars 9 formed on the axle 4 and disposed between said tops. There are four of these members for each wheel and they are constructed so as to be balanced about the bearing lines of their knife edged supports 6 by counterweights 10 secured to their lower ends, the knife edged supports 6 resting on hardened blocks 11 carried by the base 1.

The ends of the axles 4, when resting on the roller bearings are entirely free from the thrust standards, except the possible contact of the tip of one or the other of the pointed projections 12 of each axle with an adjustable end thrust screw 13. One of these projections is on each end of each axle with its tip in the axis of rotation of said axle, and they are intended to minimize the frictional moment, due to the end pressure that may be produced between them and the thrust screws by the movement of the ship. By this method of mounting the wheels, they are practically unaffected by rotary motion in the plane or planes normal to their axles. The mass ring of each clinometric wheel is connected to a hub 14, by means of thin disks 15, which are secured to the hub and ring, and into this hub the axles are inserted. These axles are preferably made of hardened steel and are held in place by threaded collars 4$^a$ so that they may be readily withdrawn from their hubs and replaced by new ones.

Adapted to a groove 16 formed in the periphery of each clinometric wheel, and extending from one to the other, is a belt which is moved by and in unison with the wheels and tends to equalize any motions of rotation that may occur in them. The grooves 16 have the same or nearly the same bottom dimensions, so that the tangent portions of the belt are parallel or approximately so. The flexible sections 17 of said belt are of like dimensions and have a small clevis or other connecting member 18 at each end, which members in turn are attached to an inclination-recording-pen holding carriage 19, and a counterpoise carriage 19$^a$ by means of split pins or other securing members indicated at 20, so that when united the belt consists of two flexible sections and two carriages placed alternately.

The carriages 19 and 19$^a$ are as light as possible and also of the same weight and construction, so that they will balance each other when the centers of the two clinometric wheels are not in the same horizontal plane. They are also constructed to offer the minimum of frictional resistance.

A recording table 21 is provided, see Figs. 2, 3 and 5 which is supported by a series of angle members 22, 23, 24 and 25, secured to the base 1 and tied together by the cross braces 26, 27 and 28. This structure also supports the supply roller 29 shown in Figs. 3 and 5 from which the record sheet 30 is unwound, a tension regulator under which it passes before crossing over the said recording table, and the rollers 31, 32 and 33 for regulating the speed of, guiding and rewinding the record sheet, all of which will be more fully described hereinafter.

Mounted on blocks 34 above the recording table 21, as shown in Fig. 5 and disposed transversely to the line of travel of the record sheet, are the rails 35 for supporting and guiding the upper or inclination-recording-pen holding carriage 19. This carriage comprises a diamond-H frame clearly shown in Figs. 9, 10 and 11 having a vertical guiding tube 36 in which is a freely moving gravity reservoir pen 37, (the inclination-recording-pen) with its stylographic or fountain pen point 38, arranged to engage the record sheet at all times, in order that the travel of its holding carriage relative thereto may be recorded. The carriage is provided with vertically mounted wheels 39, see Figs. 9, 10 and 11 which run on the horizontal portions of the rails, and horizontally mounted wheels 40, which may engage the inner vertical wall or walls of the said rail or rails. The wheels 39 support the carriage in its travels along the rails while the wheels 40 insure its guidance in a line parallel to the vertical walls of the same. The distance the upper carriage may travel along its rails is limited by the pins 20 as shown in Figs. 1, 9 and 11 which project sufficiently to engage the lateral extensions 42 of the rails. Indirectly these extensions 42 limit the travel of the lower carriage 19$^a$.

To the lower or counterpoise carriage 19$^a$, a weight 41, equaling the weight of the charged inclination-recording-pen, may be added as a substitute for the same. The rails 35$^a$ for the counterpoise carriage are of the same cross section as the rails 35, but omit the lateral extensions 42, and they are suitably supported by the base 1 of the structure. The wheels of the carriage 19$^a$ mounted thereon engage the rails 35$^a$ in the same manner as the wheels of carriage 19 engage the rails 35.

All motions of the ship are imparted to the instrument as a whole, except when the clinometric wheels are resting on their rocker bearings and are substantially free to rotate about their axles, in which case any rotary motion in the plane or planes normal to their axles will not have any practical effect on them and consequently there will be relative rotary motion between the clinometric wheels, their belt and the remainder of the instrument. The upper carriage through its inclination-recording-pen, which is in constant engagement with the record sheet, makes a complete and continuous record of this relative rotary motion, or continuous change of inclination—produced by the rolling, pitching, and other motions of the ship.

The record sheet 30 is preferably of thin paper of uniform gage or thickness, and with a smooth surface. It is carried by the supply roller 29, as shown in Fig. 5 and passes from the same to the record table 21, against the rounded edge 43 of which it is pressed by the tension regulator 44, thence over the table and under the various pens mounted on the back pen rail, under the inclination-recording-pen holding carriage 19, to the regulating rollers 31 and 32, and finally to the winding-up roller 33.

The supply roller 29 consists of a tube flanged at one end, fastened to a shaft 45, and is exactly like the winding-up roller 33. It is so constructed that a roll of fresh paper can be readily slipped or wound on the same. This roller is held in its bearings by means of a screw 46 and a lock-nut 46$^a$ at each end in the same manner as the rollers shown in Fig. 12 with sufficient pressure to insure that the record sheet shall be just taut as it is delivered to the record table.

The rounded edge 43 of the record table is a part of the tension regulating surface and serves to receive the record sheet at a tangent to its surface, so as to deliver the same without crease or wrinkle. To insure uniform tension in the record sheet, the tension regulator 44, held in place by the nuts 47, see Figs. 3 and 5 is pressed by suitable springs 48 against the paper as it passes over the rounded edge 43. The compression of the springs is regulated by nuts 49 and 50, as shown in Fig. 3 the latter acting as locknuts. To remove the tension regulator without disturbing its adjustment, the nuts 47 are backed off, and to return it to its former position and adjustment, the parts are replaced and said nuts 47 screwed up until tight.

The auxiliary regulating roller 31 is mounted on the side of the record table opposite the tension regulator and is employed to increase the angle of contact between the record sheet and the regulating rollers so as to insure complete control of the record sheet speed. As shown in Fig. 12, it consists of a plain cylinder with a spur gear 31$^a$ at one end meshing with a spur gear 32$^a$ on the main regulating roller 32, said pair of spur gears being so proportioned that the circumferential velocities of the two regulating rollers are equal. The roller 31 is supported by a screw 46 and a lock nut 46$^a$ at each end, in the same manner as the supply roller, but without binding in its bearings.

The main regulating roller 32 is provided with a spur gear 32$^a$ for the purpose mentioned above, and a bevel gear 51 at the opposite end which meshes with a bevel pinion 52 carried by the vertical shaft 53; the roller being driven at a practically uniform angular velocity by said shaft. This roller also has a flange at each end to guide the record sheet, and is supported by screws 46 and lock nuts 46$^a$ in the same manner as the auxiliary regulating roller 31.

The winding-up roller 33 comprises a tube flanged at one end, that is screwed or otherwise secured to the winding-up shaft 54, and upon it the record is wound. By this arrangement the shaft 54 can be readily freed of the roller 33 with its finished record, and another roller fitted on and the whole prepared to wind up a new record. At one end of the winding-up shaft is a friction disk 55 which is engaged by a movable friction driving disk 56, which serves to maintain a practically uniform tension in the record sheet between the winding-up roller and the regulating roller.

The pressure necessary to secure the friction between the disks 55 and 56, is produced by a movable bearing pin 57 pressed against the opposite end of the winding-up shaft 54 by a spring 58 and a nut 59 fitted into a holder 60, which pin may be adjusted to increase or decrease the tension in the record sheet between the winding-up and regulating rollers. To remove the winding-up roller for renewal, the holder 60 is backed off sufficiently to free the winding-up shaft of its bearings; the rollers are then exchanged, the shaft replaced and the holder 60 screwed back until tight, bringing the new roller to the adjustment of the former. The friction end of the winding-up shaft is supported by a pin 61 carried by a block 61$^a$ and fitting into a circular recess or hole 62 in the end of a shaft 54. This connection is such that there is no contact of the end of the shaft with the block 61$^a$, so that the winding-up shaft is free to move in the direction of its longitudinal axis, permitting the movable bearing pin 57 to press the friction disk 55 into contact with the friction driving disk 56.

The friction driving disk 56 derives its power from the shaft 53 and rotates with it, but has additional motion along said shaft, being carried by a sleeve 56$^a$ movable on said shaft. This motion of the friction driving disk along the shaft is controlled by a lever 63 pivoted at 63$^a$, see Figs. 2 and 12 connected at one end to the sleeve 56$^a$ and having at its opposite end a roller 64 kept in constant contact with the record sheet 30 on the winding-up roller by a spring 65, thus maintaining a fixed ratio between the distance of the friction driving disk from the center of the axle of the winding-up shaft and the outside diameter of the wound up portion of the record sheet. Due to this fact, combined with the fact that the friction driving disk is a trifle larger than is necessary for just winding up the record sheet, it maintains a practically uniform tension in the record sheet between the winding-up and regulating rollers. This tension may vary within certain limits, however, and not interfere with the uniformity of the record sheet travel, as these changes affect the pull of the regulating rollers inversely, and within these certain limits the total work done by the winding-up and regulating rollers is constantly equal, and is a factor of the tension produced by the tension regulator.

Power for actuating the winding-up roller is produced by coiled springs 66 and 67, placed in cases 68, 69, 70 and 71, mounted on a shaft 72, journaled in suitable bearings 73 formed in the base at the back of the instrument. This power is transmitted from the springs through the gear wheels 74 and 75 to a drum 76, from which it is delivered by a wire 77 to a fusee cone 78 and from the latter to the fusee axle 79 and ratchet wheel 80, thence to the double pawl 81 carried by the bolt 82, the gear wheels 83 and 84, and in turn to the shafts 85, 86 and 87, through the medium of the gear wheels 85$^a$, 86$^a$, 86$^b$, 87$^a$ and 87$^b$, the latter meshing with the gear wheel 88 attached to the vertical shaft 53 which actuates the bevel pinion 52, and the friction driving disk 56, all of which construction is fully disclosed in Fig. 4.

On the transmission shaft 87, which is provided with a feather, a slotted sleeve 89 is placed which rotates with it. At the ends of the sleeve are bevel gears 90 and 91, which can be meshed alternately with bevel gears 92 and 93 carried by a governor shaft 94, by shifting said sleeve along the shaft 87 by means of a lever 89$^a$. By this mechanism I am enabled to get with the same speed of the governor, record sheet speeds of the ratio of 1 to 10, or any other ratio for which the gears are designed.

The governing mechanism consists of weights 95 carried by flat springs 96 fastened at their tops and bottoms to blocks 97 and 98 respectively. The lower block 98 is grooved at 99, and engaging this groove is the end of a lever 100, pivoted at 101 and having its opposite end disposed above a collar 102 fastened to the vertical shaft 53 and resting on the bearing 103. When in action, the governor weights fly away from the shaft 94, and in so doing bend the springs 96 and lift the bottom block along the shaft 94 and with it the end of the lever 100 engaging the same, consequently depressing the other end. Should the speed exceed that for which it is set, the free end of the lever will press down on the collar 102, and the friction between the two will tend to check the velocity of the shaft 53. This pressure may be regulated by the thumb screw 104 and spring 105.

The fusee and main springs are intended to deliver almost equal amounts of work for each inch of record sheet unwound, and the auxiliary spring 106 and its operating system including the ratchet wheel 80, the pawl 81 carried by the bolt 82, the gear wheels 83 and 84, the ratchet wheel 107 and the pawl 108, see Fig. 5, make it possible to wind the main springs by a socket wrench applied to the squared end 79$^a$ of the fusee axle without interrupting the travel of the record sheet. With its stopping device, it also limits the winding and unwinding of the main springs in order to increase or decrease the power given off for one winding.

The stopping device for the power transmitting system is fully shown in Fig. 4 and consists of a gear wheel 109 arranged to mesh with a single tooth pinion 110 mounted on the axle 79 at the small end of the fusee, and for each rotation of the latter, said gear wheel is moved one tooth. The gear wheel 109 is fastened to or formed integral with a shaft 111, mounted in suitable bearings formed in the same parts of the structure supporting the shaft of the cylinder 76 and the fusee shaft 79. This shaft 111 is threaded at 112, and a nut 113, with a depending projection 114 suitably guided, is mounted on the threaded portion and is longitudinally moved on the shaft as the latter rotates with the gear wheel 109. Mounted on this shaft is a movable stop 115 and the hub of the gear wheel 109 forms another stop member 116 to limit the travel of the nut in both directions on the said shaft. When winding up the springs the fusee will be rotated in one direction and movement imparted to the gear wheel 109 by the single tooth pinion 110; the shaft being rotated in such a direction as to cause the nut 113 to move toward the stop 115, and when said fusee barrel is rotated in the opposite direction through the unwinding therefrom of the cord or wire 77 by the power transmitted by the springs, the nut 113 will be moved in the opposite direction until contacting with the stop 116.

The stop 115 comprises a check nut mounted on the threaded portion of the shaft 111 and having an offset face to engage a similar face on the nut 113. The stop 116 formed by the hub of the gear wheel 109, is also provided with an offset face to engage a similar face on the opposite side of the nut 113.

The check nut 115 forming one stop is adjustable along the threaded portion of the shaft 111 and may be held at any desired point to limit the travel of the nut 113 and through the latter the amount of rotation of the fusee. This check nut is held in place by a locking sleeve 117 mounted on the squared end 118 of the shaft 111 and movable along the same, being held in the desired position by means of a set screw. The abutting faces of the check nut and locking sleeve are formed with clutch teeth meshing with each other thereby preventing rotary motion of the check nut relative to the shaft 111.

A change in the power of the main springs between the limits chosen for the number of revolutions, may be effected by winding or unwinding the main springs at the squared end 72ª of the central shaft 72, see Fig. 3. The torque of the springs is taken up by the ratchet wheel 120 forming part of the spring case 71, and the pawl 121.

To raise the clinometric wheels from or lower them onto the bearing members 5, or bring them to rest relative to the base 1, a lifting system or apparatus is employed, part of which consists of a table 125 disposed under each of the said wheels as shown in Fig. 4 and arranged to move into contact with, or away from the peripheral surfaces of the same. These tables are capable of independent motion, so that either or both of the clinometric wheels may be raised or lowered or brought to rest relative to the base at one time.

Referring to Fig. 4, in which is shown a sectional elevation, and to Fig. 6, in which is shown a plan view, I will proceed to describe that part of the lifting system or apparatus pertaining to the right hand clinometric wheel. Suitably journaled in the base of the instrument beneath the lifting table 125, is a bell-crank lever 126, having arms 127 connected to the said lifting table, and an arm 128 connected by a rod or link 129 to the arms 130 of the hollow rock shaft 131. This shaft is suitably journaled in the base of the instrument and is secured at its outer end to an operating lever 132. This lever is mounted on the outside of the instrument as is clearly shown in Figs. 2 and 3, and the upper end of the same is grooved and disposed in engagement with a segmental guide 133, to which it may be clamped in any desired position by means of a hand screw 134.

The lifting table and bell crank lever beneath the other clinometric wheel are precisely the same as the corresponding parts noted above, and the rod or link 129ª shown in Fig. 4 leading from the bell-crank lever 126ª is connected by a pin or other suitable means to the arm extending from the sleeve 130ª attached to the rock shaft 131ª mounted in the hollow rock shaft 131. This rock shaft 131ª is capable of similar movement with or independent of the said hollow rock shaft. To the outer end of the shaft 131ª an operating lever 132ª is connected, mounted on the outside of the instrument directly in front of the lever 132. The upper end of this lever is also grooved and disposed in engagement with the segmental guide 133, to which it may be secured in any desired position by means of a hand screw 134ª. The manner of forming the upper ends of the operating levers for engagement with the guide is clearly shown in section in Fig. 3. As noted, these levers are independently movable to operate the lifting tables beneath the clinometric wheels, but they may be connected by means of the bolt 135 to act as one, so as to operate said tables simultaneously, when such action is desired. If this is done, one hand screw will be sufficient to operate and hold them.

As a part of the lifting system and to be operated in connection therewith is the device for rotating the clinometric wheels. This is clearly shown in Figs. 4 and 6, and will be described with respect to the right hand clinometric wheel. Journaled in the arms 136 of the lifting table are the rollers 137 having toothed portions 138 forming worm wheels. Disposed beneath these worm wheels and meshing with them are the worms 139 carried by a longitudinal shaft 140, suitably journaled and capable of rotation to operate the rollers 137 and thereby rotate the clinometric wheel when it is in frictional engagement therewith. The other lifting table is provided with a similar mechanism, hence it will be unnecessary to repeat the description of the parts. A single shaft 140 is employed to operate the rollers 137 of both lifting tables and is preferably flexible so that it will not interfere with their individual freedom in being lifted or lowered, and at all times is free to rotate the rollers 137 and the clinometric wheel or wheels that is, or are in frictional engagement therewith. The shaft 140 is operatively connected to a short transmitting shaft 141, which latter shaft is operated from a vertical shaft 142 by means of the bevel gears 143 and 144, said vertical shaft being turned by a crank 145. The shaft 140 is placed in operative engagement with the shaft 141 by the following means. The shaft 141 carries a crank arm 146 having a pin 147 at its outer end, and the shaft 140 has a crank arm 148 having a slot 149, into which said pin enters. By this means the vertical movement of the shaft 140 is permitted without being affected, or prevented from being rotated by the transmitting shaft 141.

When the clinometric wheels are lifted clear of their bearings formed by the curved faces of the members 5, said members 5, as shown in Figs. 6 and 7 should be brought to their initial position by lining-up pins, passed through holes 149ª in the base standards 2, and other holes 149ᵇ near the tops of the members 5, and the inclination recording pen holding carriage brought to the central position by rotating the clinometric wheels about their axles, with the turning device. The clinometric wheels may then be lowered onto their rocker bearings and supported by them and the lifting table, and the lining-up pins withdrawn, placing the inclination recording mechanism in readiness to be released for an observation.

The upper rails 35 for the inclination-recording-pen holding carriage rest on blocks 34, see Fig. 5, and are disposed sufficiently above the record table 21 to clear the points of the five pens mounted on the pen rail 150, and also in such position that the point of the inclination recording pen is just in contact with the record sheet. Four of these pens may be termed "auxiliary pens", and consist of a time pen 151 placed at the extreme left and almost on the edge of the record sheet with its point in line with the points of the following three pens which are placed in the order named; the starboard propeller pen 152, the rudder position pen 153 and the port propeller pen 154; or if the ship has but one screw only one propeller pen will be used, and in like manner any additional propellers will be connected to additional pens as shown in Fig. 1.

The line passing through the points of these four pens is parallel to the constraining track of the inclination-recording-pen holding carriage and as close to the point 38 of the inclination recording pen as is possible without interfering with the travel of the said pen. The fifth pen mounted on the back pen rail is a time pen 155, and it is located near the extreme right edge of the record sheet, with its point in the line of travel of the point of the inclination recording pen and is to be used in conjunction therewith. Both time pens 151 and 155 are ordinary chronograph pens and are pulled to one side by the armatures of magnets 156, electrically connected with a circuit closer located within a chronometer; with circuit closers or keys on deck and near the operator, and with the necessary electrical battery or batteries.

The rudder position pen 153, see Fig. 1, is disposed at the center of the pen rail and is caused to travel toward one end or the other of the recording table by means of a rack 157 and pinion 158 rotated mechanically through a connection with the rudder, so that the amount and direction of movement of the rudder position pen from its normal central position is proportional to, and related to the magnitude and direction of the angle that the rudder has been turned through from the center line of the ship.

The complete rudder pen structure 153 is clearly shown in Figs. 13 and 14, and includes a frame 159 mounted on a rod 160 carried by the back pen rail 150, and a recording point 161 arranged to engage the record sheet. The pen body is hinged to the frame at the points 162 and the said frame has a portion in engagement with a guide-bar 163. The contact of the pen with the record sheet may be regulated by a compression spring 164, interposed between the frame and pen body, a threaded stem 165 passing from the frame through the pen body, and a nut 166 bearing against the pen body and holding the same in contact with the spring. The portion of the frame encircling the rod 160 and movable along the same is provided with a rack 157 with which meshes a pinion 158 carried by a shaft 167 journaled in a bearing 168 secured to the back of the pen rail. At the opposite end of this shaft a bevel gear 169 is mounted, whereby this pen may be placed in operative connection with the rudder post.

As shown in Figs. 15 and 16, the gear 169 meshes with a bevel gear 170 mounted at the lower end of the vertically swinging shaft 171 which is journaled at the top in adjustable bearings. At the upper end of this shaft a grooved segmental sheave 172 is mounted, in the groove of which wires or ropes 173 and 174 are disposed, being secured to the said sheave and also to the segmental sheave 175 mounted on the rudder post 176. The upper portion of the shaft 171 carrying the sheave 172 rests in two movable bearings 177 and 178 carried by rods 179 arranged to slide in suitable brackets 180, which bearings are forced forward by the springs 181 so as to keep the wires 173 and 174 taut and allow for the working or laboring of the ship. These wires or ropes are guided from one sheave to the other by means of the loose sheaves, or rollers, 182 in such manner as to be about equally effected by the working or laboring of the ship.

The propeller pens 152 and 154 are similar to the time pens, but each is connected to a special circuit closing device, shown in Fig. 15, arranged at the forward end of each propeller shaft. One of these special circuit closing devices consists of a worm wheel 185 driven by a worm 186 that is carried by a shaft 187 rotated by the propeller shaft, and for each rotation of said shaft the worm wheel makes, for instance, one one-hundredth of a revolution.

Disposed near the periphery and on one side of the worm wheel 185 are a number of projections, sections of an annular projection, that differ in length and are arranged as indicated at 188 and 189. Between said projections are fixed spaces 190 and 191 also differing in length. The projections act as circuit closers between the wires 192 and 193, and the spaces between the same as circuit breakers. The circuit breaking spaces may be filled by non-conducting material so as to give a mechanically complete annular projection. The projections and spaces on the worm wheel shown, take up respectively, 18°, 36°, 54°, 72°, 18°, 36°, 54° and 72° of the full circle in the order named, which is a 1-2-3-4 series; the projections occupying the 18° and 54° portions, and the spaces the 36° and 72° portions. The number of degrees, however, is immaterial, so long as the interval series 1-2-3-4, or some other regular series is preserved. Under the conditions assumed, the circuit is closed for five revolutions, then opened for ten revolutions, then closed for fifteen revolutions, and then opened for twenty revolutions; this operation continuing to repeat itself as long as the propellers are not reversed. When they are reversed, however, the spacings on the record sheet for the circuit closing and breaking read backward, and also show when reversal took place. The plan view of the record sheet shows two engine revolution diagrams, in which it will be noted that the port engine is reversed while the starboard engine is going ahead.

The operation of the instrument forming the subject of my invention may be best explained by considering one placed athwartship as shown in Fig. 15, ready for an observation on rolling, the main time pen and all the auxiliary pen connections made, the inclination-recording-pen ready to move when the "clinometric wheels" are released from the lifting tables, and the record sheet in motion. As the operation of the auxiliary pens has been made clear, the following explanation will be confined to the working of the inclination-recording-pen. To begin the observation for rolling, the clinometric wheels should be released when the ship has no rotary motion in the plane or planes normal to the axles of said wheels as all rotary motion of this kind at the moment of release will be the absolute rotary motions of the clinometric wheels referred to the earth. Should the release not have been coincident with the dead point in the roll it may be necessary to note with the time pen the dead points of the roll, and also by observing the horizon, when the ship passes through the upright position, and afterward spot these points on the inclination diagram. As this noting of the upright position, and the subsequent spotting on the inclination diagram may be desirable under all conditions, it will be seen that the failure to make the release at the dead point will have caused no material harm. Should much absolute rotary motion have become entrapped, however, the inclination-recording-pen holding carriage will have a considerable resultant travel toward one edge of the record sheet, in which case the clinometric wheels must be brought to rest relative to the base before the pen gets too near the edge of the record sheet, and again released when a slight rotary motion of the opposite kind has been imparted to them. If this expedient in releasing cannot be followed, the clinometric wheels should be rotated by the turning device until the inclination recording pen is where wanted, and then released. As each ship will have its individual peculiarities, which in turn will be modified by different conditions of loading, as well as by the external conditions, i. e., the position of the rudder, the rotations of the propellers, &c., it will be necessary to handle the instrument differently under varying conditions.

The previous description has been confined to the instrument as shown set up athwartship for rolling observations. To secure an inclination diagram of the motion in any other vertical plane of the ship, the instrument must be turned until the clinometric wheels are in a plane parallel to the desired plane of observation, and for pitching it must be turned through 90 degrees from the athwartship position and then reconnected as for rolling, except that the rudder position mechanism will require the addition of an extra gear or gears between the lower swinging gear 170, and the bevel gear 169 on the back pen rail.

Should it be desirable to record the effect of rolling or pitching on pendulums of various lengths to the same scale and on the same record sheet as that of the inclination diagram, a track for a pen holding carriage should be added to the instrument, in front of the inclination-recording-pen holding carriage track, and fastened to the record table, on which such pen carriage should be placed and connected to a flexible cord or belt passing around two light wheels and disposed in a groove in the face of each of the same dimensions as those in the clinometric wheels. These wheels should have their centers above or below the centers of the clinometric wheels, equal to about the diameters of the bottom of their grooves, and far enough apart to clear the instrument. A pendulum weight should be attached to a spoke or the continuations of the same of one of the wheels. By omitting the said pendulum weight, and fixing a telescope to one of the wheels, and keeping the horizontal crosshair sighted on the horizon, the true curve of the ship's changing inclination, in the plane of revolution of the telescope is secured. This curve may be used to more readily interpret the clinometric wheel records.

For the wind velocity record, an ordinary chronograph pen may be electrically connected to an anemometer and arranged to record in line with the auxiliary pens, and for other information other auxiliary pens may be added to, or substituted for those already shown.

As a precaution, the clinometric wheels should be protected from drafts and accidental contact of any character by a removable housing covering most of the instrument, and provision for the same has been made in the design. This housing, however, is an unimportant detail so far as the operation of the instrument is concerned, not properly belonging to my invention and hence is not illustrated nor further described. Furthermore, the clinometric wheels should be free of the lifting tables only when the operator is present, and at all other times raised by the lifting tables and locked by bringing the axles 4 into contact with the guard caps of their bearings. This in no way interferes with the auxiliary pens, and their records, which may continue without interruption, except to renew the record sheet.

In Fig. 17, I have shown a form of instrument, partly in diagram, in which one of the heavy clinometric wheels has been replaced by a wheel whose mass and moment of inertia have been reduced to the minimum, so that it may be readily controlled through the belt connecting it to its mate, the lifting table and its operating members being omitted from under the said light wheel. For this light wheel the supporting axle is reduced in diameter so that the rocker bearing members may be replaced by Atwood friction wheels, or simple bearing recesses or holes in the thrust screws 13. The belt diameters of the two wheels are equal or nearly so.

The installation and action of the instrument in this form is substantially the same as that employing two heavy clinometric wheels of the same design, and the work of the operator is reduced to the direct control of the heavy clinometric wheel.

In lieu of having the inclination-recording-pen holding carriage as a constituent part of the belt connecting the clinometric wheels, such belt may be continuous and the inclination-recording-pen holding carriage provided with a grip or clamp to engage such continuous belt at any point.

It will be understood that my invention is not limited to the precise forms or constructions of devices or combination of devices illustrated or described, since their equivalents may be employed and various modifications not differing nor departing from their essential or controlling features or purposes may be substituted, without departing from either principal, purposes, or scope of the several features of my invention. For example:—I may substitute for the power system, i. e., the main springs and equalizing fusee, any suitable motor connected to a spiral spring, and arranged to automatically keep the spring at nearly a uniform tension. Connected to the other end of the said spiral spring and actuated thereby, should be a shaft and gear, the said gear meshing with the gear 87ª of the present design. Or, I may substitute for the present power and governing mechanisms a constant speed electric motor connected to the shaft 53 so as to drive it at the desired velocity. In case a constant speed electric motor with an excess of power is used in lieu of the power and governing system, the compensator, or uniform tension device for the rewinding roller, comprising the parts 63, 64 and 65 may be omitted, and the friction driving disk 56 attached to the shaft 53 so that it will constantly maintain tension in the record sheet between the winding-up and regulating rollers. Again, I may substitute bands for the flexible cords of the belt, and change the grooves in the peripheries of the clinometric wheels, to ridges for the reception of the flexible bands; or each flexible cord may be cut in two equal parts and the cut ends fastened to the peripheries of the clinometric wheels so as to permit the wheels to rotate only about 90 degrees from their initial positions. Again, the pair of clinometric wheels need not be of the same size though they should have the same or about the same belt diameters. Again, the collars on the axles of the clinometric wheels, used to prevent fouling between the rocker bearings themselves and the remainder of the instrument, may be omitted and the axles grooved for the reception of the rocker bearings. Again, I may omit the flanges from the regulating rollers, as guiding devices, and add a guiding ridge to each end of the record table. Again, I may substitute whole sheaves for the segmental sheaves that are part of the rudder position mechanism. Again, I may omit the main time pen 155 or substitute for the same a pen for another purpose with its point in line with the points of the auxiliary pens, and equate the inclination diagram from the chronograph record of the auxiliary pen 151.

Further changes or substitutions too numerous to mention may be made which in no manner affect the purposes or scope of this invention, hence I consider myself entitled to all such variations as may lie within the scope of my claims.

Having thus described my invention, I claim and desire to secure by Letters Patent:

1. In an instrument for measuring and recording the inclination of a ship from the vertical, the combination of two pivotally mounted and freely movable clinometric wheels, an inclination recording pen, means whereby said pen is moved by and in unison with said wheels, and means for indicating such movement upon a record sheet through the behavior of said wheels.

2. The combination, in an apparatus for measuring and recording the rolling or pitching motions of ships, of a pair of pivotally mounted and freely movable clinometric wheels, a movable recording pen, means for operatively connecting said clinometric wheels and the recording pen whereby the movement of said wheel will directly actuate the pen, provision for obtaining the markings of said pen upon a record sheet, and means for moving said record sheet relatively to the pen.

3. The combination, in an apparatus for measuring and recording the rolling or pitching motions of ships, of a pair of freely movable clinometric wheels, a recording pen disposed between said wheels and so mounted with respect to the same as to be moved thereby and engage a record sheet arranged to pass beneath and receive the marking of said pen, and means for moving said sheet.

4. The combination, in an apparatus for measuring and recording the rolling or pitching motions of ships, of a pair of freely movable clinometric wheels, a connection for the same whereby the movement of either one will be influenced by the other, a recording pen carried by and moved with said connection and arranged to engage a movable record sheet, and means for moving said sheet.

5. The combination, in an instrument for measuring and recording the inclination of a ship from the vertical, of two freely movable clinometric wheels, an inclination recording pen, means whereby said pen is moved by and in unison with said wheels, a chronograph pen, means for operating the same, said pens being disposed in engagement with a moving record sheet arranged to receive the markings of the same, and means for moving said record sheet.

6. The combination, in an instrument for measuring and recording the inclination of a ship from the vertical, of two freely movable clinometric wheels, an inclination recording pen, means whereby said pen is moved by and in unison with said wheels, a chronograph pen, means for operating the same, other recording pens, independent operating means therefor, all of said pens being disposed in engagement with a moving record sheet arranged to receive the markings of the same, and means for moving said record sheet.

7. The combination, in an instrument for measuring and recording the inclination of a ship from the vertical, of two freely movable clinometirc wheels, an inclination recording pen disposed between said wheels and connected thereto so as to be moved in unison therewith, a chronograph pen, said pens being disposed in engagement with a moving record sheet arranged to pass beneath and receive the markings of the same, and means for moving said record sheet.

8. The combination in an instrument for measuring and recording the inclination of a ship from the vertical, of two freely movable clinometric wheels, an inclination recording pen disposed between said wheels and connected thereto so as to be moved in unison therewith, a chronograph pen, other recording pens, said pens being disposed in engagement with a moving record sheet arranged to pass beneath and receive the markings of the same, and means for moving said record sheet.

9. The combination, in an apparatus for measuring and recording the rolling or pitching motions of a ship, of a freely movable clinometric wheel, a mounting for the same, a belt attached to said wheel and movable therewith, a pen connected to said belt and provision for indicating the movement of said pen upon a record sheet.

10. The combination, in an apparatus for measuring and recording the rolling or pitching motions of a ship, of a pair of freely movable clinometric wheels, mountings for the same, a belt attached to said wheels and movable therewith, a pen connected to the belt, and provision for indicating the movement of said pen upon a record sheet.

11. The combination, in an apparatus for measuring and recording the rolling or pitching motions of ships, of a pair of freely movable clinometric wheels, a belt connecting the same whereby the movement of either one will influence or be influenced by the other, said wheels being grooved for the reception of the belt, a recording pen connected to said belt and moved with the same, and provision for indicating the movement of said pen upon a record sheet.

12. The combination, in an instrument for measuring and recording the inclination of a ship from the vertical, of two freely movable clinometric wheels, a connection for the same that tends to equalize their rotary motions, an inclination recording pen attached to and movable with said connection and arranged to mark upon a moving record sheet, and means for moving said record sheet.

13. The combination, in an instrument for measuring and recording the inclination of a ship from the vertical, of two freely rotatable clinometric wheels, an endless band forming a connection for the same tending to equalize their rotary motions and causing them to move in unison, an inclination recording pen attached to and movable with said endless band, a chronograph pen, operative means therefor, both of said pens being arranged to mark upon a moving record sheet, and means for moving said record sheet.

14. The combination, in an instrument for measuring and recording the inclination of a ship from the vertical, of two freely rotatable clinometric wheels, a belt connecting the same and tending to equalize their rotary motions, an inclination recording pen forming a constituent part of said belt, a chronograph pen, said pens being arranged to mark upon a moving record sheet, and means for moving said record sheet.

15. The combination, in an instrument for measuring and recording the inclination of a ship from the vertical, of two freely rotatable clinometric wheels, a belt connecting the same and tending to equalize their rotary motions, an inclination recording pen forming a constituent part of said belt, a chronograph pen, other recording pens, all of which pens are arranged to mark upon a moving record sheet, and means for moving said record sheet.

16. The combination, in an instrument for measuring and recording the inclination of a ship from the vertical, of two freely rotatable clinometric wheels, a belt connecting the same and tending to equalize their rotary motions, an inclination recording pen holding carriage forming a constituent part of said belt, a pen carried thereby, and a counterpoise carriage disposed opposite said pen holding carriage and forming part of said belt.

17. The combination, in an instrument for measuring and recording the inclination of a ship from the vertical, of two freely rotatable clinometric wheels, a belt connecting the same and tending to equalize their rotary motions, a carriage, an inclination recording pen mounted therein, and a counterpoise carriage disposed opposite thereto, both of which carriages form constituent parts of said belt, a chronograph pen, said pens being arranged to mark upon a moving record sheet, and means for moving said record sheet.

18. The combination, in an instrument for measuring and recording the inclination of a ship from the vertical, of two freely rotatable clinometric wheels, a belt connecting the same and tending to equalize their rotary motions, a carriage, an inclination recording pen mounted therein, and a counterpoise carriage disposed opposite thereto, both of which carriages form constituent parts of said belt, a chronograph pen, other recording pens, all of which pens are arranged to mark upon a moving record sheet, and means for moving said record sheet.

19. The combination, in an instrument for measuring and recording the inclination of a ship from the vertical, of two freely movable clinometric wheels, an inclination recording pen, an endless band connecting said wheels to which said pen is attached whereby it is moved by and in unison with said wheels, a series of automatically and key actuated pens operating independently of the inclination recording pen, all of said pens being disposed so that their points are in a line at right angles to the line of movement of a record sheet and arranged to mark upon said sheet, and means for moving said record sheet.

20. The combination, in an instrument for measuring and recording the inclination of a ship from the vertical, of two freely rotatable clinometric wheels, a belt connecting the same and tending to equalize their rotary motions, said wheels being arranged to receive flexible portions of the belt, a chronograph pen, an inclination recording pen operatively connected to said belt and arranged to mark upon a moving record sheet with the chronoghaph pen, and means for moving said sheet record.

21. The combination, in an instrument for measuring and recording the inclination of a ship from the vertical, of two freely rotatable clinometric wheels, a belt connecting the same and tending to equalize their rotary motions, said wheels being arranged to receive flexible portions of the belt, a chronograph pen, other recording pens, an inclination recording pen operatively connected to said belt and arranged to mark upon a moving record sheet with the chronograph and other recording pens, and means for moving said record sheet.

22. The combination, in an instrument for measuring and recording the inclination of a ship from the vertical, of two freely rotatable clinometric wheels, a belt connecting the same and tending to equalize their rotary motions, said wheels being arranged to receive flexible portions of the belt, a chronograph pen, and as constituent parts of the belt an inclination recording pen, a holding carriage for the same, and a counterpoise carriage opposite the holding carriage, said inclination recording pen being arranged to mark upon a record sheet with the chronograph pen.

23. The combination, in an instrument for measuring and recording the inclination of a ship from the vertical, of two freely rotatable clinometric wheels, a belt connecting the same and tending to equalize their rotary motions, said wheels being arranged to receive flexible portions of said belt, an inclination recording pen holding carriage and a counterpoise carriage opposite the same operatively connected with said belt, and constraining rails or tracks for said carriages.

24. The combination, in an instrument for measuring and recording the inclination of a ship from the vertical, of two freely rotatable clinometric wheels, a belt connecting the same and tending to equalize their rotary motions, a chronograph pen, an inclination recording pen, a holding carriage therefor and a counterpoise carriage operatively connected to said belt, supporting and guiding wheels for said carriages, and constraining rails or tracks with which said wheels contact, said inclination recording pen being arranged to mark upon a record sheet with the chronograph pen.

25. The combination, in an instrument for measuring and recording the inclination of a ship from the vertical, of two freely rotatable clinometric wheels, a belt connecting the same and tending to equalize their rotary motions, a chronograph pen, other recording pens, an inclination recording pen, a holding carriage therefor and a counterpoise carriage operatively connected to said belt, supporting and guiding wheels for said carriages, and constraining rails or tracks with which said wheels contact, said inclination recording pen being arranged to mark upon a record sheet with the chronograph and other recording pens.

26. The combination, in an instrument for measuring and recording the inclination of a ship from the vertical, of two freely rotatable clinometric wheels, a belt connecting the same and tending to equalize their rotary motions, a chronograph pen, and as constituent parts of said belt, two carriages having diamond-H frames and tubular holders, an inclination recording pen and a counterweight mounted in said holders, connections at the ends of the frames for adjusting the tension of the belt, supporting and guiding wheels for said carriages, and constraining rails or tracks with which said wheels contact, said inclination recording pen being arranged to mark upon a record sheet with the chronograph pen.

27. The combination, in an instrument for measuring and recording the inclination of a ship from the vertical, of two freely rotatable clinometric wheels, a belt connecting the same and tending to equalize their rotary motions, a chronograph pen, other recording pens, and as constituent parts of the said belt, two carriages having diamond-H frames and tubular holders, an inclination recording pen and a counterweight mounted in said holders, connections at the ends of the frames for adjusting the tension of the belt, supporting and guiding wheels for said carriages, and constraining rails or tracks with which said wheels contact, said inclination recording pen being arranged to mark upon a record sheet with the chronograph and other recording pens.

28. The combination, in an instrument for measuring and recording the inclination of a ship from the vertical, of a pair of clinometric wheels connected so as to be freely movable in unison, an inclination recording pen secured to said connection so as to be moved by and in unison with said clinometric wheels, a chronograph pen, said pens being arranged to mark upon a record sheet, and means for bringing said clinometric wheels to rest relatively to the rest of the instrument.

29. The combination, in an instrument for measuring the inclination of a ship from the vertical and recording upon a record sheet the markings of a pen or pens indicative of such movement, of a pair of freely movable clinometric wheels, an inclination recording pen moved by and in unison with said wheels, a chronograph pen, means for bringing the clinometric wheels to rest, and means for imparting translatory and rotary motion to them.

30. The combination, in an instrument for measuring the inclination of a ship from the vertical and recording upon a record sheet the markings of a pen or pens indicative of such movement, of a pair of freely movable clinometric wheels, a belt connecting the same and tending to equalize their rotary motions, an inclination recording pen, a holding carriage for the same and a counterpoise carriage operatively connected to said belt, and means for imparting translatory and rotary motions to said wheels so as to bring the pen holding carriage to any desired position.

31. The combination, in an instrument for measuring the inclination of a ship from the vertical and recording upon a record sheet the markings of a pen or pens indicative of such movement, of a pair of freely movable clinometric wheels, a belt connecting the same and tending to equalize their rotary motions, an inclination recording pen, penholding and counterpoise carriages operatively connected to said belt, constraining rails or tracks for said carriages, and means for imparting translatory and rotary motions to said clinometric wheels so as to bring the pen holding carriage to any desired position.

32. The combination, in an instrument for measuring and recording the inclination of a ship from the vertical, of two clinometric wheels, lifting tables for the same, rollers carried by said tables for temporary engagement with said clinometric wheels or either of them, and means for actuating said rollers whereby either or both of said wheels may be rotated.

33. The combination, in an instrument for measuring and recording the inclination of a ship from the vertical, of two clinometric wheels, lifting tables for the same, rollers carried by said tables for temporary engagement with said wheels or either of them, worm wheels carried by said rollers, and means for operating said worm wheels whereby the rollers may be moved to rotate the clinometric wheels.

34. The combination, in an instrument for measuring and recording the inclination of a ship from the vertical, of two clinometric wheels, lifting tables for the same, bell crank levers connecting said lifting tables, rock shafts, link or rod connections between said bell crank levers and rock shafts, operating levers connected to said rock shafts whereby the lifting tables may be raised or lowered, and means for locking said operating levers or either of them in any desired position or positions.

35. The combination, in an instrument for measuring and recording the inclination of a ship from the vertical, of two clinometric wheels, a belt connecting the same and tending to equalize their rotary motions, an inclination recording pen operatively connected to said belt, a pair of rollers disposed beneath each wheel, means for raising said rollers into temporary engagement with the wheels, and means for rotating said rollers and through them the wheel or wheels in temporary engagement therewith.

36. The combination, in an instrument for measuring and recording the inclination of a ship from the vertical, of two clinometric wheels, a belt connecting the same and tending to equalize their rotary motions, an inclination recording pen operatively connected to said belt, a pair of rollers beneath each clinometric wheel, worm wheels on said rollers, a shaft, worms carried thereby and in engagement with said worm wheels, and means for rotating said shaft, whereby said clinometric wheels when in contact with the rollers may be rotated.

37. The combination, in an instrument for measuring and recording the inclination of a ship from the vertical, of two clinometric wheels, lifting tables arranged beneath the same, operating levers mechanically connected to said tables and capable of being independently or simultaneously moved, and means for locking said operating levers in any desired position or positions.

38. The combination, in an instrument for measuring the inclination of a ship from the vertical and recording upon a record sheet the markings of a pen or pens indicative of such movement, of a pair of freely movable clinometric wheels, a belt connecting the same and tending to equalize their rotary motions, a pen holding carriage, an inclination recording pen carried thereby, a counterpoise carriage opposite the pen holding carriage, said carriages being operatively connected to said belt, a table for the record sheet, means for moving said record sheet across said table at a uniform velocity, and a chronograph pen for engagement therewith.

39. The combination, in an instrument for measuring the inclination of a ship from the vertical and recording the same upon a record sheet, of a pair of clinometric wheels, a belt connecting the same and tending to equalize their rotary motions, a pen holding carriage, a counterpoise carriage opposite the pen holding carriage, said carriages being operatively connected to the belt, a table for the record sheet, means for moving said record sheet across said table at a uniform velocity, a chronograph pen, other recording pens, and an inclination recording pen carried by said pen holding carriage so as to engage the record sheet with said chronograph and other recording pens.

40. The combination, in an instrument for measuring and recording the inclination of a ship from the vertical, of two freely movable clinometric wheels, an inclination recording pen, an endless band connecting said pen with the clinometric wheels whereby it may be moved by and in unison with said wheels, a chronograph pen, both of said pens being arranged to mark upon a moving record sheet, and means for actuating said sheet.

41. The combination, in an instrument for measuring and recording the inclination of a ship from the vertical, of two freely movable clinometric wheels, an inclination recording pen, an endless band connecting said pen with the clinometric wheels whereby it may be moved by and in unison with the said clinometric wheels, a chronograph pen, other recording pens, all of said pens being arranged to mark upon a moving record sheet, and means for actuating said sheet.

42. The combination, in an instrument for measuring and recording the inclination of a ship from the vertical, of two freely movable clinometric wheels, an inclination recording pen, an endless band connecting said pen with the clinometric wheels whereby it may be moved by and in unison with the said wheels, a chronograph pen, both of said pens being arranged to mark upon a moving record sheet, and means for moving said record sheet under the pens at substantially a uniform velocity.

43. The combination, in an instrument for measuring and recording the inclination of a ship from the vertical, of two freely movable clinometric wheels, an inclination recording pen, an endless band connecting said pen with the clinometric wheels whereby it may be moved by and in unison with the said wheels, a chronograph pen, other recording pens, all of said pens being arranged to mark upon a moving record sheet, and means for moving said record sheet under the pens at substantially a uniform velocity.

44. The combination, in an instrument for measuring and recording the inclination of a ship from the vertical, of two freely movable clinometric wheels, an inclination recording pen, an endless band connecting said pen with the clinometric wheels whereby it may be moved by and in unison with the said wheels, a chronograph pen, both of said pens being arranged to mark upon a moving record sheet, and means for moving said record sheet under the pens at about right angles to the line of movement of the inclination recording pen.

45. The combination, in an instrument for measuring and recording the inclination of a ship from the vertical, of two freely movable clinometric wheels, an inclination recording pen, an endless band connecting said pen with the clinometric wheels whereby it may be moved by and in unison with the said wheels, a chonograph pen, both of said pens being arranged to mark upon a moving record sheet, a table over which said sheet passes, a roller for winding up said sheet, and means for keeping said sheet taut as it passes over said table.

46. The combination, in an instrument for measuring and recording the inclination of a ship from the vertical, of two freely movable clinometric wheels, an inclination recording pen, an endless band connecting said pen with the clinometric wheels whereby it may be moved by and in unison with the said wheels, a chronograph pen, other recording pens, all of said pens being arranged to mark upon a moving record sheet, a table over which said sheet passes, a roller for winding up said sheet, and means for keeping said sheet taut as it passes over said table.

47. The combination, in an apparatus for measuring and recording the rolling or pitching motions of a ship, of a freely movable clinometric wheel, a recording pen, an endless band connecting said pen and wheel whereby said pen is moved by and in unison with said wheel and arranged to record the behavior of the latter upon a moving record sheet, and means for moving said sheet.

48. The combination, in an apparatus for measuring and recording the rolling or pitching motions of a ship, of a freely movable clinometric wheel, a recording pen, an endless band connecting said pen and wheel whereby said pen is moved by and in unison with said wheel and arranged to record the behavior of the latter upon a moving record sheet, and means for moving said record sheet at substantially right angles to the path of movement of said pen.

49. The combination, in an apparatus for measuring and recording the rolling or pitching motions of a ship, of a pair of freely movable clinometric wheels, a pen moved in unison with said wheels for recording said rolling or pitching motions upon a moving record sheet, means for arresting the movement of said wheels relatively to the structure carrying the same, and means for moving said record sheet.

50. The combination, in an apparatus for measuring and recording the rolling or pitching motions of a ship, of a pair of freely movable clinometric wheels, a pen moved in unison with said wheels for recording said rolling or pitching motions upon a moving record sheet, means for moving said record sheet, and means for arresting the movement of said wheels relatively to the structure carrying the same.

51. The combination, in an apparatus for measuring and recording the rolling or pitching motions of a ship, of a pair of freely movable clinometric wheels, a pen moved in unison with said wheels for recording said rolling or pitching motions upon a moving record sheet, means for arresting the movement of said wheels relatively to the structure carrying the same, means for imparting movement to said wheels, and means for moving said record sheet.

52. The combination, in an apparatus for measuring and recording the rolling or pitching motions of a ship, of a pair of freely movable clinometric wheels, a connecting belt for the same whereby the movement of either one will influence or be influenced by the other, a pen carriage attached to said belt, a pen free to move vertically carried by the pen carriage for engagement with a moving record sheet, and means for moving said record sheet.

53. The combination, in an apparatus for measuring and recording the rolling or pitching motions of a ship, of a pair of freely movable clinometric wheels, a connecting belt for the same whereby the movement of either will influence or be influenced by the other, a pen carriage attached to said belt, supporting and guiding wheels mounted on said carriage, a way or track for said wheels, a pen freely movable in a vertical direction supported by said carriage for engagement with a moving record sheet, and means for moving said record sheet.

54. The combination, in an apparatus for measuring the rolling or pitching motions of a ship and recording upon a moving record sheet the markings of a pen indicative of such movement, of a pair of freely movable clinometric wheels, a connection for the same whereby the movement of either one will influence or be influenced by the other, a recording pen attached to said connection, means for moving said wheels mechanically independently of the movement of the ship so as to bring said pen to any desired position with respect to the record sheet when beginning a record, and means for moving said record sheet.

55. The combination, in an apparatus for measuring the rolling or pitching motions of a ship and recording upon a moving record sheet the markings of a pen indicative of such movement, of a pair of freely movable clinometric wheels, a flexible belt connecting the same whereby the movement of either one will influence or be influenced by the other, a pen carried by said belt, means for moving said wheels mechanically independently of the movement of the ship so as to bring said pen to any desired position with respect to the record sheet when beginning a record, and means for moving said record sheet.

56. The combination, in an apparatus for measuring the rolling or pitching motions of a ship and recording upon a moving record sheet the markings of a pen indicative of such movement, of a pair of freely movable clinometric wheels, a belt connecting the same whereby the movement of either one will influence or be influenced by the other, a carriage attached to said belt, a pen freely movable in a vertical direction mounted in said carriage, means for moving said wheels mechanically independently of the movement of the ship so as to bring said pen to any desired position with respect to the record sheet when beginning a record, and means for moving said record sheet.

57. The combination, in an apparatus for measuring the rolling or pitching motions of a ship and recording upon a moving record sheet the markings of a pen indicative of such movement, of a pair of freely movable clinometric wheels, a belt connecting the same whereby the movement of either one will influence or be influenced by the other, said wheels being prepared for the reception of the belt, a pen carriage attached to said belt, a pen mounted therein, a guiding support for said carriage, means for moving said wheels mechanically independently of the movement of the ship so as to bring the pen carriage to any desired position with respect to the record sheet when beginning a record, and means for moving said record sheet.

58. The combination, in an instrument for measuring and recording the inclination of a ship from the vertical, of two clinometric wheels, axles for the same, bearings for said axles, means for positioning the axles longitudinally, and means for obtaining a record through the behavior of said clinometric wheels.

59. The combination, in an instrument for measuring and recording continuously the inclination of a ship from the vertical, the combination of two clinometric wheels, axles for the same, rocker bearings for said axles, means for positioning the axles longitudinally, and means for obtaining a record through the behavior of said clinometric wheels.

60. The combination, in an apparatus for measuring and recording the rolling or pitching motions of a ship, of a pair of freely movable clinometric wheels, axles therefor, mountings for said axles, and supports for said mountings, the latter comprising independent members having bearing surfaces on the arc of a circle struck from the point of their support.

61. The combination, in an apparatus for measuring and recording the rolling or pitching motions of a ship, of a pair of freely movable clinometric wheels, axles therefor, mountings for the same, and supports for said mountings, the latter comprising independent inclined members having bearing surfaces on the arc of a circle struck from the point of their support.

62. The combination, in an apparatus for measuring and recording the extent of rolling or pitching motions of a ship, of a pair of freely movable clinometric wheels, axles therefor, mountings for the same, and knife-edged supports for said mountings, the latter having axle bearing surfaces generated by a curve revolved about the bearing lines of their knife-edged supports as axes.

63. The combination, in an apparatus for measuring and recording the rolling or pitching motions of a ship, of a pair of freely movable clinometric wheels, axles therefor, mountings for the same, supports for said mountings, the latter comprising independent inclined members having bearing surfaces on the arc of a circle struck from the point of their support, and guards at the ends of said bearing surfaces.

64. The combination, in an apparatus for measuring and recording the rolling or pitching motions of a ship, of a pair of freely movable clinometric wheels, axles therefor, mountings for the same, supports for said mountings, the latter comprising independent inclined members, knife-edged supports for the members, compensating weights carried by their lower ends, said members having axle bearing surfaces generated by a curve revolved about the bearing lines of their knife-edged supports as axes, and guards at the ends of said bearing surfaces.

65. The combination, in an instrument for measuring and recording the inclination of a ship from the vertical, of two freely movable clinometric wheels, axles for the same, a pointed projection located on each end of each axle with its tip in the axis of rotation of said axle, mountings for said axles comprising thrust screws to react on said tips, independent rocker bearings for said axles, and supports for the same, the surfaces of said bearings that are in contact with the axles being generated by a curve revolved about the bearing lines of their supports as axes.

66. The combination, in an instrument for measuring and recording the inclination of a ship from the vertical, of two freely movable clinometric wheels, axles for the same, a pointed projection located on each end of each axle with its tip in the axis of rotation of said axle, mountings for said axles comprising thrust screws to react on said tips, independent rocker bearings for said axles, knife-edged supports for said rocker bearings, the axle bearing surfaces of the latter being generated by a curve revolved about the bearing lines of their knife-edged supports as axes, and horn-like projections at the ends of said axle bearing surfaces.

67. The combination, in an instrument for measuring and recording the inclination of a ship from the vertical, of two freely movable clinometric wheels, axles therefor, a pointed projection located on each end of each axle with its tip in the axis of rotation of said axle, mountings for the axles comprising thrust screws to react on said tips, independent rocker bearings for said axles, knife-edged supports for said bearings, the axle bearing surfaces of the latter being generated by a curve revolved about the bearing lines of their knife edge supports as axes, and provision on the axles of the clinometric wheels to prevent the rocker bearings from fouling each other and the remainder of the instrument.

68. The combination, in an instrument for measuring and recording the inclination of a ship from the vertical, of two freely movable clinometric wheels, axles therefor, a pointed projection located on each end of each axle with its tip in the axis of rotation of said axle, mountings for the axles comprising thrust screws to react on said tips, independent rocker bearings for said axles, knife-edged supports for said bearings, the axle bearing surfaces of the latter being generated by a curve revolved about the bearing lines of their knife edged supports as axes, a counterweight in the lower end of each rocker bearing to balance the same, and provision on the axles of the clinometric wheels to prevent the rocker bearings from fouling each other and the remainder of the instrument.

69. The combination, in an instrument for measuring and recording the inclination of a ship from the vertical, of two freely movable clinometric wheels, anti-friction mountings for the same, an inclination recording pen connected to and moved in unison with the said wheels and arranged to indicate their behavior upon a moving record sheet, and means for arresting the motion of the clinometric wheels relatively to the remainder of the instrument.

70. The combination, in an instrument for measuring and recording the inclination of a ship from the vertical, of two freely movable clinometric wheels, rocker bearings for the same, and means for lifting said wheels from said bearings.

71. The combination, in an instrument for measuring and recording the inclination of a ship from the vertical, of two freely movable clinometric wheels, rocker bearings for the same, means for lifting said wheels from said bearings, and means for adjusting the bearings before lowering the wheels into contact therewith.

72. The combination, in an apparatus for measuring and recording the rolling and pitching motions of a ship, of a pair of freely movable clinometric wheels, axles for said wheels, mountings for said axles comprising independent members whose bearing surfaces are on the arc of a circle struck from the point of their support, means for lifting said wheels from their bearings, and means for adjusting said bearings before the wheels are replaced thereon.

73. The combination, in an instrument for measuring and recording the inclination of a ship from the vertical, of two freely movable clinometric wheels, axles for said wheels, a pointed projection on each end of each axle, with its tip on the axis of rotation of said axle, mountings for said axles comprising thrust screws to react on said tips, independent rocker bearings for said axles, knife-edged supports for the same, the axle bearing surfaces of said rocker bearings being generated by a curve revolved about the bearing lines of their knife-edged supports as axes, means for lifting said clinometric wheels from said bearings, and means for adjusting said bearings before lowering said wheels into contact therewith.

74. The combination, in an instrument for measuring and recording the inclination of a ship from the vertical, of two freely movable clinometric wheels, axles for the same, rocker bearings therefor, means for positioning said axles longitudinally, supports for such positioning means, means for bodily raising the clinometric wheels and their axles thereby releasing them from their rocker bearings, and means carried by said bearings for returning them to their initial positions in order to properly receive the axles of the clinometric wheels.

75. In an instrument for measuring and recording the inclination of a ship from the vertical, the combination of a pair of clinometric wheels, axles for the same, bearing supports for said axles, means for positioning the axles longitudinally, a mounting for such positioning means, means for raising the wheels and their axles bodily thereby releasing them from their bearing supports, said bearing supports and said mountings for the axle positioning means having apertures arranged to register, and pins fitting said apertures for positioning the bearing supports to receive the axles of the clinometric wheels.

76. The combination, in a measuring instrument having means for making a record upon a moving record sheet, of a series of rolls upon which the same is wound, means for actuating the winding-up roller, including a cylinder, a fusee, springs, and a wire passing from said cylinder to the fusee, a governor for controlling the speed of the winding-up shaft, and coacting means therefor contacting with the winding-up roll and controlled by the size of the latter as the record sheet is wound upon the same.

77. The combination, in a measuring instrument having means for making a record upon a moving sheet, of a series of rolls upon which the same is wound, means for actuating the winding-up roller, including a cylinder, a fusee, and a wire passing from said cylinder to the fusee, a governor for controlling the speed of the winding-up shaft, springs for actuating said cylinder, and means contacting with the winding-up roller co-acting with said governor.

78. The combination, in a measuring instrument having means for making a record upon a moving sheet, of a series of rolls for carrying the same including a winding-up roller, means for actuating the winding-up roller including a cylinder, a fusee, springs, and a wire passing from said cylinder to the fusee, stop mechanism operatively connected with said fusee, and means for regulating the surface speed of the winding-up roll.

79. The combination, in a measuring and recording instrument having means for making a record upon a moving sheet, of a series of rolls upon which the same is wound, means for actuating the winding-up roller including a cylinder, a fusee, springs, and a wire passing from said cylinder to the fusee, stop mechanism geared with the fusee, and a single tooth pinion mounted on the fusee shaft for operating said stop mechanism.

80. The combination, in an instrument for measuring having means for making a record upon a moving sheet, of a series of rollers including a speed regulator for operating said sheet, means for actuating said rollers including a spring motor, a cylinder, a fusee, a wire passing from said cylinder to the fusee, stop mechanism geared with the fusee, and a single toothed pinion mounted on the fusee shaft for operating said stop-mechanism, and a governor for regulating the angular velocity of the speed regulator.

81. The combination, in an instrument for measuring and recording, of a main frame, a record table carried by the same over which a record sheet is arranged to be moved, means for moving said sheet, a concaved block extending entirely across the record sheet and forming a brake shoe, and means for holding said block in frictional engagement with said record sheet.

82. The combination, in a measuring and recording instrument, of the main frame, a record table carried by the same over which a record sheet is arranged to be moved, a curved edge for the table, a block substantially the full width of the record table for engagement with the record sheet as it passes over said curved edge, and means for holding said block in engagement with the record sheet.

83. The combination, in an apparatus for measuring and recording the rolling or pitching motions of a ship, of a pair of clinometric wheels, lifting tables for the same, rollers carried by said tables and in temporary engagement with the wheels, and means for actuating said rollers whereby the wheels may be bodily moved.

84. The combination, in an apparatus for measuring and recording the rolling or pitching motions of a ship, of a pair of clinometric wheels, lifting tables for the same, bell-crank levers connected to said lifting tables, a rock shaft, sleeve connections between said bell crank levers and the rock shaft, operating levers connected to said rock shaft and sleeve whereby the lifting tables may be raised, and means for locking said operating levers.

85. The combination, in an apparatus for measuring and recording the rolling or pitching motions of a ship, of a pair of clinometric wheels, lifting tables for the same, rollers carried by said lifting tables in temporary engagement with the wheels, worm wheels carried by said rollers, worms in engagement therewith, and means for operating said worms.

86. The combination, in an apparatus for measuring and recording the rolling or pitching motions of a ship, of a pair of clinometric wheels, a belt connecting the same whereby the movement of either one will influence or be influenced by the other, a pen carried by said belt, a pair of rollers arranged beneath each wheel, means for raising said rollers into engagement with the wheel or wheels, and means for moving said rollers so as to position the wheel or wheels.

87. The combination, in an apparatus for measuring and recording the rolling or pitching motions of a ship, of a pair of clinometric wheels, a belt connecting the same whereby the movement of either one will be influenced by the other, a pen carriage attached to said belt, rollers arranged beneath each wheel, worm wheels on said rollers, a shaft, worms carried thereby in engagement with said worm wheels, and means for moving said shaft whereby the clinomtric wheels may be moved by the frictional contact of the moving rollers.

88. The combination, in an apparatus for measuring and recording the rolling or pitching motions of a ship, of a pair of clinometric wheels, lifting tables arranged beneath the same, bell crank levers connected to said lifting tables, operating levers connected to the bell crank levers, and means for locking said operating levers.

89. The combination, in an instrument for measuring and recording the inclination of a ship from the vertical, of two clinometric wheels, an inclination recording pen, an endless band connecting said pen with the clinometric wheels whereby it may be moved by and in unison with said wheels to record their behavior upon a moving record sheet, a chronograph pen, other pens wherewith to record the rotations of the propeller or propellers and the position of the rudder, all of said pens being arranged to mark upon the record sheet, and means for moving said record sheet.

90. The combination, in an instrument for measuring and recording the inclination of a ship or boat from the vertical, of two clinometric wheels, an inclination recording pen, an endless band connecting said pen with the clinometric wheels whereby it may be moved by and in unison with said wheels to record their behavior upon a moving record sheet, a chronograph pen, other pens to record the rotations of the propeller or propellers and the position of the rudder, provision for mounting said pens, all of the mounted pens being arranged to mark upon the record sheet, and means for moving said record sheet.

91. The combination, in an instrument for measuring and recording the inclination of a ship or boat from the vertical, of two clinometric wheels, axles therefor, tips located on the ends and at the centers of said axles, thrust screws for positioning the clinometric wheels and taking the thrust of their axle tips, an inclination recording pen moved by and in unison with said clinometric wheels to record their behavior upon a moving record sheet, a chronograph pen to record the time, pens to record the rotations of the propeller or propellers and the position of the rudder, provision for mounting other pens, all of the mounted pens being arranged to mark upon the record sheet, and means for moving said record sheet.

92. The combination, in an instrument for measuring and recording the inclination of a ship from the vertical, of two clinometric wheels, axles therefor, thrust screws for positioning the same, tips located on the ends and at the centers of said axles, said screws taking the reaction of the tips, an inclination recording pen moved by and in unison with said clinometric wheels to record their behavior upon a moving record sheet, a chronograph pen to record the time, other pens wherewith to record the rotations of the propeller or propellers and the position of the rudder, emplacements for other recording pens, all of the mounted pens being arranged to mark upon the record sheet, and means for moving said record sheet.

93. The combination, in an instrument for measuring and recording the inclination of a ship from the vertical, of two clinometric wheels, axles therefor, thrust screws for positioning the same, tips located on the ends and at the centers of said axles, said screws taking the end thrust of the tips, supporting bearings for the axles, an inclination recording pen moved by and in unison with said wheels to record their behavior upon a moving record sheet, a chronograph pen to record the time, other pens wherewith to record the rotations of the propeller or propellers and the position of the rudder, emplacements for said recording pens, all of the mounted pens being arranged to mark upon the record sheet, and means for moving said record sheet.

94. The combination, in an instrument for measuring and recording the inclination of a ship or boat from the vertical, of two clinometric wheels, axles therefor, thrust screws for positioning the same, tips located on the ends and at the centers of said axles, said screws taking the end thrust of the tips, supporting bearings for said axles, means for bringing the clinometric wheels to rest with reference to the remainder of the instrument either singly or simultaneously, an inclination recording pen moved by and in unison with said wheels to record their behavior upon a moving record sheet, a chronograph pen to record the time, other pens wherewith to record the rotations of the propeller or propellers and the position of the rudder, emplacements for said recording pens, all of the mounted pens being arranged to record severally and simultaneously on the moving record sheet, and means for moving said record sheet.

95. The combination, in an instrument for measuring and recording the inclination of a ship or boat from the vertical, of two clinometric wheels, axles therefor, thrust screws for positioning the same, tips located on the ends and at the centers of said axles, said screws taking the end thrust of the tips, supporting bearings for said axles, means for bringing the clinometric wheels to rest with reference to the remainder of the instrument either singly or simultaneously, an inclination recording pen moved by and in unison with said wheels to record their behavior upon a moving record sheet, a chronograph pen to record the time, emplacements for other pens wherewith to record the rotations of the propeller or propellers and the position of the rudder, all of the mounted pens being arranged to record on the record sheet, and means for moving said record sheet.

96. The combination, in an instrument for measuring and recording the inclination of a ship or boat from the vertical, of two clinometric wheels, axles therefor, thrust screws for positioning the same, tips located on the ends and at the centers of said axles and in engagement with said screws, supporting bearings for said axles, means for bringing to rest, raising and lowering the clinometric wheels with reference to the remainder of the instrument either singly or simultaneously, an inclination recording pen moved by and in unison with said wheels to record their behavior upon a moving record sheet, a chronograph pen to record the time, other pens wherewith to record the rotations of the propeller or propellers and the position of the rudder, all of the mounted pens being arranged to mark upon the record sheet, and means for moving said record sheet.

97. The combination, in an instrument for measuring and recording the inclination of a ship or boat from the vertical, of two clinometric wheels, axles therefor, thrust screws for positioning the same, tips located on the ends and at the centers of said axles and in engagement with said screws, supporting bearings for said axles, means for bringing to rest, raising and lowering the clinometric wheels with reference to the remainder of the instrument either singly or simultaneously, an inclination recording pen moved by and in unison with said wheels to record their behavior upon a moving record sheet, a chronograph pen to record the time, emplacements for other pens wherewith to record the rotations of the propeller or propellers and the position of the rudder, all of the mounted pens being arranged to mark upon the record sheet, and means for moving said record sheet.

98. The combination, in an instrument for measuring and recording the inclination of a ship or boat from the vertical, of two clinometric wheels, axles therefor, thrust screws for positioning the same, tips located on the ends and at the centers of said axles and in engagement with said screws, supporting bearings for said axles, means for bringing to rest, raising, lowering and rotating the clinometric wheels with reference to the remainder of the instrument either singly or simultaneously, an inclination recording pen moved by and in unison with said wheels to record their behavior upon a moving record sheet, a chronograph pen to record the time, other pens wherewith to record the rotations of the propeller or propellers and the position of the rudder, all of the mounted pens being arranged to mark upon the record sheet, and means for moving said record sheet.

99. The combination, in an instrument for measuring and recording the inclination of a ship or boat from the vertical, of two clinometric wheels, axles therefor, thrust screws for positioning the same, tips located on the ends and at the centers of said axles and in engagement with said screws, supporting bearings for said axles, means for bringing to rest, raising, lowering and rotating the clinometric wheels with reference to the remainder of the instrument either singly or simultaneously, an inclination recording pen moved by and in unison with said wheels to record their behavior upon a moving record sheet, a chronograph pen to record the time, emplacements for other pens wherewith to record the rotations of the propeller or propellers and the position of the rudder, all of the mounted pens being arranged to mark on the record sheet, and means for moving said record sheet.

100. The combination, in an instrument for measuring and recording the inclination of a ship or boat from the vertical, of two clinometric wheels, an inclination recording pen moved by and in unison with said wheels to record their behavior upon a moving record sheet, a chronograph pen to record the time, other pens wherewith to record the rotations of the propeller or propellers and the position of the rudder, all of the mounted pens being arranged to mark upon the record sheet, and means for actuating said sheet.

101. The combination, in an instrument for measuring and recording the inclination of a ship or boat from the vertical, of two clinometric wheels, an inclination recording pen moved by and in unison with said wheels to record their behavior upon a moving record sheet, a chronograph pen to record the time, emplacements for other pens wherewith to record the rotations of the propeller or propellers and the position of the rudder, all of the mounted pens being arranged to mark upon the moving record sheet, and means for actuating said sheet.

102. The combination, in an instrument for measuring and recording the inclination of a ship or boat from the vertical, of two clinometric wheels, an inclination recording pen moved by and in unison with said wheels to record their behavior upon a moving record sheet, a chronograph pen to record the time, other pens wherewith to record the rotations of the propeller or propellers and the position of the rudder, all of the mounted pens being arranged to mark upon the record sheet, and rollers for supplying, actuating and winding-up said sheet.

103. The combination, in an instrument for measuring and recording the inclination of a ship or boat from the vertical, of two clinometric wheels, an inclination recording pen moved by and in unison with said wheels to record their behavior upon a moving record sheet, a chronograph pen to record the time, emplacements for other pens wherewith to record the rotations of the propeller or propellers and the position of the rudder, all of the mounted pens being arranged to mark upon the record sheet, rollers for supplying, actuating and winding-up said sheet, and means for actuating said rollers.

104. The combination, in an instrument for measuring and recording the inclination of a ship or boat from the vertical, of two clinometric wheels, an inclination recording pen moved by and in unison with said wheels to record their behavior upon a moving record sheet, a chronograph pen to record the time, other pens wherewith to record the rotations of the propeller or propellers and the position of the rudder, all of the mounted pens being arranged to mark upon the record sheet, rollers for supplying, actuating and winding-up said sheet, means for controlling its velocity of travel, and means for actuating said rollers.

105. The combination, in an instrument for measuring and recording the inclination of a ship or boat from the vertical, of two clinometric wheels, an inclination recording pen moved by and in unison with said wheels to record their behavior upon a moving record sheet, a chronograph pen to record the time, emplacements for other pens therewith to record the rotations of the propeller or propellers and the position of the rudder, all of said pens being arranged to mark upon the record sheet, rollers for supplying, actuating and winding-up said sheet, means for controlling its velocity of travel, and means for actuating said rollers.

106. The combination, in an instrument for measuring and recording the inclination of a ship or boat from the vertical, of two clinometric wheels, an inclination recording pen moved by and in unison with said wheels to record their behavior upon a moving record sheet, a chronograph pen to record the time, other pens wherewith to record the rotations of the propeller or propellers and the position of the rudder, all of the mounted pens being arranged to mark upon the record sheet, a table over which said sheet is drawn, and rollers for supporting, winding-up, and controlling its velocity of travel, and means for actuating said rollers.

107. The combination, in an instrument for measuring and recording the inclination of a ship or boat from the vertical, of two clinometric wheels, an inclination recording pen moved by and in unison with said wheels to record their behavior upon a moving record sheet, a chronograph pen to record the time, emplacements for other pens wherewith to record the rotations of the propeller or propellers and the position of the rudder, all of the mounted pens being arranged to mark upon the record sheet, a table over which said sheet is drawn, rollers for supporting, winding-up, and controlling its velocity of travel, and means for actuating said rollers.

108. The combination, in an instrument for measuring and recording the inclination of a ship or boat from the vertical, of two clinometric wheels, an endless band connecting said wheels, an inclination recording pen attached to said band and moved by and in unison with said wheels to record their behavior upon a moving record sheet, a chronograph pen to record the time, other pens wherewith to record the rotations of the propeller or propellers and the position of the rudder, all of the mounted pens being arranged to mark upon the record sheet which is moved at practically an uniform velocity, rollers for supplying, actuating and winding-up the record sheet, means for actuating said rollers, a roller or rollers for controlling its velocity of travel, and means for rotating said controlling or regulating roller or rollers at practically an uniform angular velocity.

109. The combination, in an instrument for measuring and recording the inclination of a ship or boat from the vertical, of two clinometric wheels, an endless band connecting said wheels, an inclination recording pen attached to said band and moved by and in unison with said wheels to record their behavior upon a moving record sheet, a chronograph pen to record the time, emplacements for other pens wherewith to record the rotations of the propeller or propellers and the position of the rudder, all of the mounted pens being arranged to mark upon the record sheet which is moved at practically an uniform velocity, rollers for supplying, actuating and winding-up the record sheet, means for actuating said rollers, a roller or rollers for controlling its velocity of travel, and means for rotating said controlling or regulating, roller or rollers at practically an uniform angular velocity.

110. The combination, in an instrument for measuring and recording the inclination of a ship or boat from the vertical, of two freely movable clinometric wheels, an endless band connecting said wheels, an inclination recording pen attached to said band and moved by and in unison with said wheels, a chronograph pen, other recording pens, said pens being arranged to mark upon a moving record sheet, a table over which said sheet is drawn, means in contact with the full width of said sheet for regulating its tension as it is drawn across the table, and means for moving said record sheet.

111. The combination, in an instrument for measuring and recording the inclination of a ship or boat from the vertical, of two freely movable clinometric wheels, an endless band connecting said wheels, an inclination recording pen attached to said band and moved by and in unison with said wheels, a chronograph pen, emplacements for other recording pens, said pens being arranged to mark upon a moving record sheet, a table over which said sheet is drawn, means in contact with the full width of said sheet for regulating its tension as it is drawn across the table, and means for moving said sheet.

112. The combination, in an instrument for measuring and recording the inclination of a ship or boat from the vertical, of two freely movable clinometric wheels, an endless band connecting said wheels, an inclination recording pen attached to said band and moved by and in unison with said wheels, a chronograph pen, other recording pens, said pens being arranged to mark upon a moving record sheet, means for imparting practically uniform motion to said sheet, a table over which the sheet is drawn, and means in contact with the full width of said sheet for regulating its tension as it is drawn across the table.

113. The combination, in an instrument for measuring and recording the inclination of a ship or boat from the vertical, of two freely movable clinometric wheels, an endless band connecting said wheels, an inclination recording pen attached to said band and moved by and in unison with said wheels, a chronograph pen, emplacements for other record pens, said pens being arranged to mark upon a moving record sheet, means for imparting practically uniform motion to said sheet, a table over which the sheet is drawn, and means in contact with the full width of said sheet for regulating its tension as it is drawn across the table.

114. The combination, in an instrument for measuring and recording the inclination of a ship or boat from the vertical, of two clinometric wheels, a belt uniting said wheels whereby the rotary motions of one will influence the rotary motions of the other, an inclination recording pen, an inclination-recording-pen-holding carriage and a counterpoise carriage connected to said belt, said carriages being moved by and in unison with the clinometric wheels so that the inclination recording pen will record their behavior, a chronograph pen to record the time, other pens whereby to record the rotations of the propeller or propellers and the position of the rudder, all of the mounted pens being arranged to mark upon a moving record sheet, and means for moving said sheet.

115. The combination, in an instrument for measuring and recording the inclination of a ship or boat from the vertical, of two clinometric wheels, a belt uniting said wheels whereby the rotary motions of one will influence the rotary motions of the other, an inclination recording pen, an inclination-recording-pen-holding carriage and a counterpoise carriage connected to said belt, said carriages being moved by and in unison with the clinometric wheels, so that the inclination recording pen will record their behavior, a chronograph pen to record the time, other pens wherewith to record the rotations of the propeller or propellers and the position of the rudder, and emplacements for other recording pens, all of the mounted pens being arranged to mark upon a moving record sheet, and means for moving said sheet.

116. The combination, in an instrument for measuring and recording the inclination of a ship or boat from the vertical, of two clinometric wheels, a belt uniting the same consisting of flexible cords or bands, an inclination recording pen, a carriage serving as the holder for said pen, a counterpoise carriage opposite the pen holding carriage, both of said carriages being connected to the belt and moved by and in unison with said clinometric wheels so that the inclination recording pen will record their behavior, a chronograph pen to record the time, and other recording pens wherewith to record the rotations of the propeller or propellers and the position of the rudder.

117. The combination, in an instrument for measuring and recording the inclination of a ship or boat from the vertical, of two clinometric wheels, a belt uniting the same consisting of flexible cords or bands, an inclination recording pen, a carriage serving as the holder for said pen, a counterpoise carriage opposite the pen holding carriage, both of said carriages being connected to the belt and moved by and in unison with said clinometric wheels so that the inclination recording pen will record their behavior, a chronograph pen to record the time, and emplacements for other pens wherewith to record the rotations of the propeller or propellers and the position of the rudder.

118. The combination, in an instrument for measuring and recording the inclination of a ship or boat from the vertical, of two clinometric wheels, a belt uniting said wheels, an inclination recording pen, a carriage for the same and a counterpoise carriage connected to said belt and disposed between flexible portions of the same so as to balance each other, said belt and carriages moving in unison with the clinometric wheels and causing the inclination recording pen to record their behavior, said wheels having their peripheries prepared for the reception of said belt, a chronograph pen to record the time, other pens wherewith to record the rotations of the propeller or propellers and the position of the rudder, all of the mounted pens being arranged to mark upon a moving record sheet, and means for moving said sheet.

119. The combination, in an instrument for measuring and recording the inclination of a ship or boat from the vertical, of two clinometric wheels, a belt uniting said wheels, an inclination recording pen, a carriage for the same and a counterpoise carriage connected to said belt and disposed between flexible portions of the same so as to balance each other, said belt and carriages moving in unison with the clinometric wheels and causing the inclination recording pen to record their behavior, said wheels having their peripheries prepared for the reception of said belt, a chronograph pen to record the time, other recording pens wherewith to record the rotations of the propeller or propellers and the position of the rudder, emplacements for other recording pens, all of the mounted pens being arranged to mark upon a moving record sheet, and means for moving said sheet.

120. The combination, in an instrument for measuring and recording the inclination of a ship or boat from the vertical, of two clinometric wheels, an inclination recording pen, a belt uniting said wheels consisting of flexible bands or cords and two carriages, one carriage serving as the holder of the inclination recording pen and the other acting as a counterpoise, constraining rails or ways on which said carriages are moved by and in unison with the clinometric wheels causing the inclination recording pen to record their behavior, a chronograph pen to record the time, other recording pens wherewith to record the rotations of the propeller or propellers and the position of the rudder, all of the mounted pens being arranged to mark upon a moving record sheet, and means for moving said sheet.

121. The combination, in an instrument for measuring and recording the inclination of a ship or boat from the vertical, of two clinometric wheels, an inclination recording pen, a belt uniting said wheels consisting of flexible bands or cords and two carriages, one carriage serving as the holder of the inclination recording pen and the other acting as a counterpoise, constraining rails or ways on which said carriages are moved by and in unison with the clinometric wheels causing the inclination recording pen to record their behavior, a chronograph pen, emplacements for other pens wherewith to record the rotations of the propeller or propellers and the position of the rudder, all of the mounted pens being arranged to mark upon a moving record sheet, and means for moving said sheet.

122. In an instrument for indicating and recording the number and the direction of the rotations of a shaft to which may be attached a ship's propeller or propellers, the combination of said shaft, a source of electrical energy, a disk rotated by said shaft and arranged to make and break an electric circuit in alternating periods of fixed numbers of rotations of said shaft, a pen mounted so as to mark said record, and other pens wherewith may be recorded simultaneously the rolling or pitching motions of a ship or boat and the position of the rudder, all of said pens being arranged to mark upon a moving record sheet, and means for moving said sheet.

In testimony whereof, I have signed my name to this specification, in the presence of two subscribing witnesses.

FELIX H. CARSSOW.

Witnesses:
MURRAY C. BOYER,
JOS. H. KLEIN.

---

Copies of this patent may be obtained for five cents each, by addressing the "Commissioner of Patents, Washington, D. C."